United States Patent [19]

Wormser

[11] Patent Number: 5,655,853

[45] Date of Patent: Aug. 12, 1997

[54] VERTICAL-SHAFT AIRLOCK

[75] Inventor: Alex Wormser, Marblehead, Mass.

[73] Assignee: Wormser Systems, Inc., Salem, Mass.

[21] Appl. No.: 355,704

[22] Filed: Dec. 14, 1994

[51] Int. Cl.$^6$ ................................................. B65G 53/46
[52] U.S. Cl. ......................... 406/66; 406/67; 222/367
[58] Field of Search ............................. 406/63, 64, 66, 406/67; 222/367

[56] References Cited

U.S. PATENT DOCUMENTS

| | | | |
|---|---|---|---|
| 3,995,777 | 12/1976 | Diez et al. | 406/63 |
| 4,092,046 | 5/1978 | Bombelli et al. | 406/64 |
| 4,179,232 | 12/1979 | Laseter | 406/63 |
| 4,462,719 | 7/1984 | Egger et al. | 406/64 |
| 4,661,024 | 4/1987 | Häfner | 406/66 |
| 4,681,484 | 7/1987 | Egger | 406/63 |
| 5,094,406 | 3/1992 | Tschumi | 406/66 |
| 5,118,224 | 6/1992 | Gerritsen | 406/67 |

FOREIGN PATENT DOCUMENTS

| | | | |
|---|---|---|---|
| 368747 | 11/1982 | Austria | B65G 53/46 |
| 0170239 | 2/1986 | European Pat. Off. | B65G 53/46 |
| 0594949 | 5/1994 | European Pat. Off. | B65G 53/46 |
| 1123978 | 2/1962 | Germany . | |

OTHER PUBLICATIONS

Oguma Iron Works Co., Inc., Drawing No. 61-30001-0 (Jan. 10, 1961).

H.A. Stoess, Jr., *Pneumatic Conveying*, Second Edition, Wiley & Sons, 1983, p. 101 et al.

*Primary Examiner*—Gary C. Hoge
*Attorney, Agent, or Firm*—Testa, Hurwitz & Thibeault, LLP

[57] ABSTRACT

A rotary valve including a rotor assembly rotatable by a driver to cause material to be transferred from an inlet side to an outlet side of the rotary valve. The rotor assembly includes a rotor coupled to a shaft which rotates about an axis when driven by the driver. The rotor includes an outer tube, an inner tube, and a plurality of radial blades. The rotary valve includes a casing assembly for supporting the rotor assembly that includes an inlet for allowing the material to enter pockets of the rotor assembly and an outlet for allowing the material to exit the rotor assembly. The casing assembly includes an upper cap disposed at a top of the casing assembly that contains an opening for allowing the material to enter the pockets of the rotor assembly, a shaft opening, and a wiper assembly that removes material from the tops of the blades as the blades pass by the inlet opening. The rotary valve also includes a plurality of springs coupling a lower cap to the sleeve that serve to compress the rotor between the caps. The rotary valve includes a bearing assembly for rotatably supporting the rotor inside the casing assembly. The bearing assembly includes an upper bearing which separates the upper cap from the top of the rotor by a minimum gap, a lower bearing which separates the lower cap from the bottom of the rotor by a minimum gap, and bearing grooves in which the bearings are disposed.

19 Claims, 12 Drawing Sheets

FIG. 2A
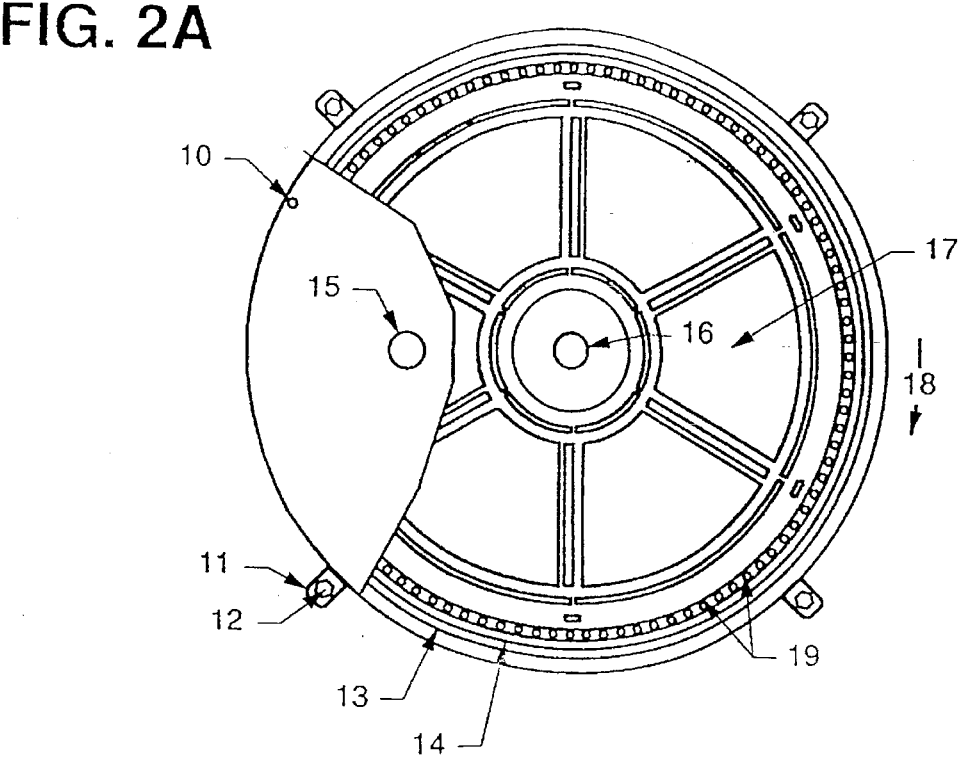
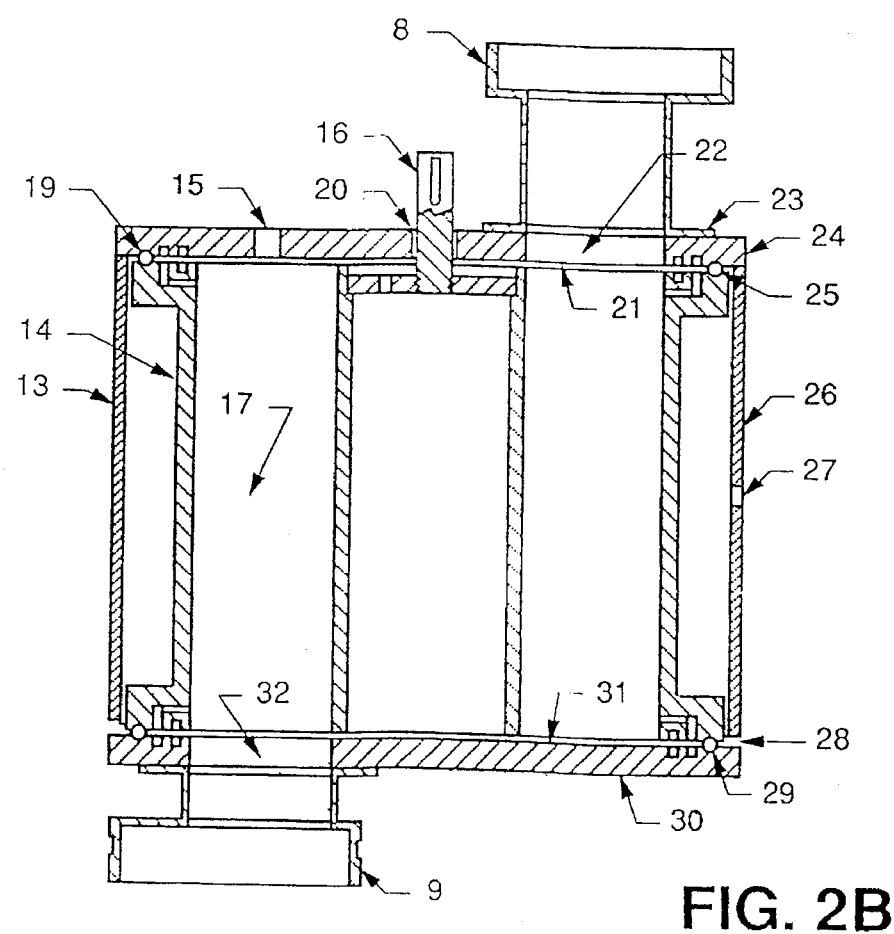
FIG. 2B

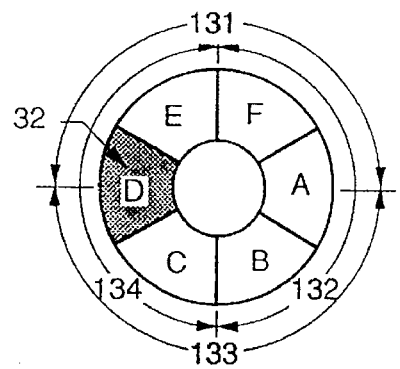
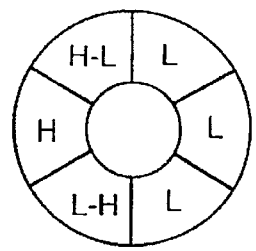
FIG. 9A  FIG. 9B
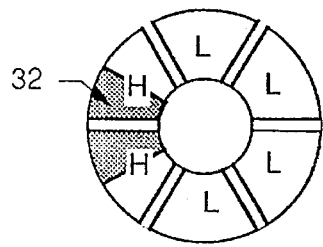
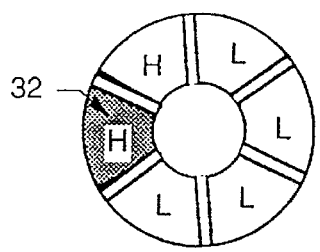
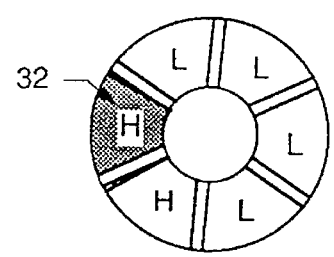
FIG. 9C  FIG. 9D  FIG. 9E
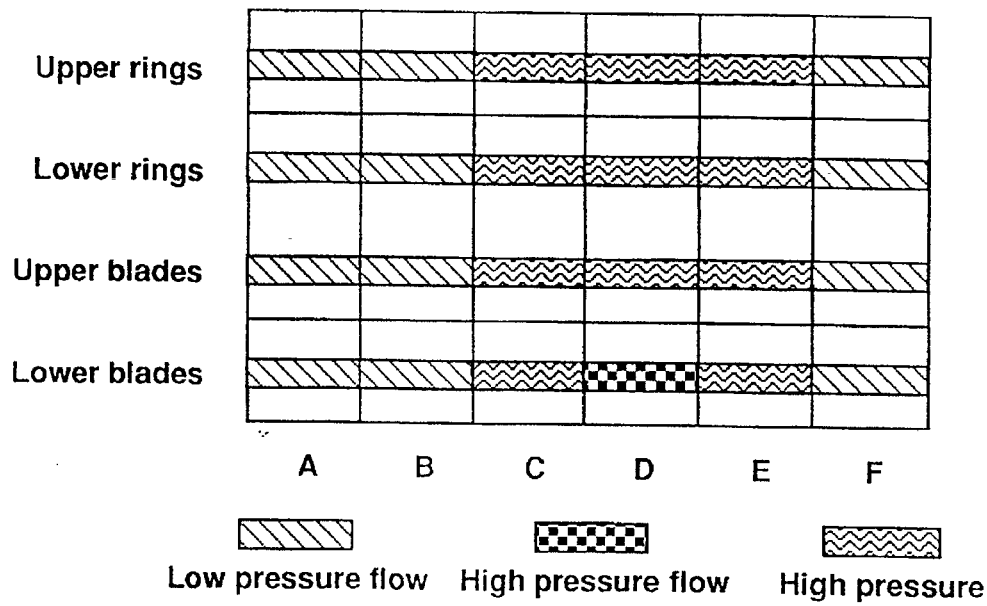
FIG. 10

VERTICAL-SHAFT AIRLOCK

FIELD OF THE INVENTION

This invention relates generally to the field of valves. In particular, the invention relates to a vertical-shaft rotary valve for injecting solid material into a fluid at a different pressure.

BACKGROUND OF THE INVENTION

Powders are processed in a wide variety of industries, including cement, chemicals, food, plastics and coal-fired power-plants, to name a few. The facilities where the powders are processed or stored commonly require conveyors to transport them around the plant. The powders are usually conveyed pneumatically, which is preferred to the alternative, mechanical conveying, because of its versatility and cleanliness.

Pneumatic conveyers provide pipes into which the powders are injected and transported by airflow. The powder is normally transferred into the pipe from an unpressurized bin. To prevent air leakage into the bin, a continuously-operating checkvalve is provided that allows the powder to enter the pipe but prevents the backflow of air into the bin; such a valve is called an air-lock.

The most commonly used airlock, called a rotary valve, includes a rotor revolving inside a casing. Shaped like a revolving door, but spinning on a horizontal axis, rotary valves allow the powder to enter through an opening in the top of the casing, be moved to the assembly's bottom by the action of the rotor, and then fall out through an opening at the casing's bottom.

Rotary valves are built with a narrow gap between the rotor and casing to keep the rotor from seizing up due to thermal expansion caused by the temperature between the casing and the rotor due to the movement of the rotor relative to the casing. The gap creates a problem when the powder being conveyed is fine and abrasive. The pressure in the conveying line entrains the powder and drives it through the gap at velocities upwards of 700 miles per hour, causing severe erosion if the powders are fine enough to flow through the gaps and are even minimally abrasive. In such applications, the life of rotary valves is too short to be useful.

An alternative airlock design, the screwpump, is used under these conditions. With a configuration similar to a domestic meatgrinder, screwpumps compress the powder by the action of a variable-pitch screw turning inside a casing. The compressed powder forms the seal that prevents the backflow of air. The electrical power needed to compress the powder with a screwpump is relatively high compared with rotary valves. Even with this limitation, screwpumps are limited to certain materials. Very abrasive materials cause excessive wear, and materials without sufficient fines or containing a lot of coarse fractions won't compact sufficiently to form a good seal.

Another airlock, the eductor, is used to convey fine and abrasive powders if the conveying line is at low pressure. Like the screwpump, the eductor normally provides acceptable levels of reliability but also uses much more electricity than a rotary valve.

Because of their low power consumption, rotary valves are still preferred in applications where low pressure and/or abrasiveness provide acceptable levels of reliability. To minimize erosion, the gap between the rotor and casing must be made as small as possible.

Gaps between the rotor and casing of conventional rotary valves occur in three areas: at the blade tips (at the rotor's outside diameter); at the blade ends (at the blades' edges in the axial direction) and in the corners (between the blade tips and the blade ends). Several designs are employed to minimize leakage.

To minimize leakage at the blade tips, the end of each blade in some rotary valves is fitted with a foil that bends back to form a seal as the blade enters the casing. To create a tight seal, the foil's springiness must be made stiff enough to counteract the airlock's back pressure. On the return side of the airlock (where the blades are moving upwards), the back pressure works in the opposite direction, adding to the spring loading and producing high bearing stresses at the tip of the foil. This quickly wears out the foils, making them ineffective after a short time. As a result, flexible foils aren't widely used.

An alternative design uses adjustable seals that are fitted as closely to the casing as possible and then fastened in place. This overcomes the effect of manufacturing tolerances and rotor wear, but still requires some clearance between the rotor and the casing to avoid seizure due to thermal expansion. The use of adjustable seals reduces the clearances.

A further alternative design uses pivoted shoes mounted inside the top of the casing near the top of the rotor. The shoes are made to fit the curvature of the rotor and are spring-loaded to provide a tight seal even when the rotor expands due to thermal expansion. The shoes are made of hardened materials to further reduce wear. This design is limited by thermal expansion which causes the curvature of the shoe to differ from that of the rotor, causing a small gap that becomes the source of erosion.

To minimize air leakage and erosion at the blade ends between the rotor and the end plates of the casing, the rotor is enclosed with end-disks that are made integral with the blades. This method is only partially effective. Leakage still occurs between the end-disks and the casing, causing erosion there.

The air leakage can be further reduced by introducing purge-air into the casing, which displaces the dust-laden air in the space between the casing's end plates and the rotor's end-disks. The purge-air increases the blowby of air into the rotary valve's inlet, which limits the purge-air's usefulness. To overcome this, yet another modification is sometimes made: seals are mounted at the tips of the rotor disks. But these seals wear quickly because the full pressure differential of the airlock presses the seal into the end-disks, at least over part of the perimeter. This causes the seals to wear very quickly.

There is currently no effective way to minimize leakage at the corner between the blade tips and the blade ends. Devices, such as adjustable seals or spring-loaded shoes can't be extended all the way to the corners or seizure will occur. The spaces left in the corners thus become a source of erosion.

Rotary valves made for handling abrasive powders are made from the hardest materials available, generally cast alloys with a Brinnel hardness of over 600. Despite this precaution, and the use of the abrasion-reducing design elements described above, failure can occur in a short time. For example, a rotary valve used to inject 200-mesh limestone at the relatively moderate pressure of 6 psi into a pneumatic conveying line at a coal-fired powerplant is found to fail abruptly and catastrophically after about 12 weeks of operation. Reliable operation requires rebuilding the airlock every eight weeks and replacing it every eight months.

The rotary valves' life is found to be independent of the design: the same results were obtained with the highestquality abrasion-resistant rotary valves made by three manufacturers. Such a high level of maintenance, in conjunction with the high cost of the airlocks, makes rotary valves marginally useful in this application. Other powerplants, using coarser limestone and/or limestone with less silica, have found rotary valves wearing out slower than what was experienced above.

Erosion is also caused by "rotor crunch", the entrapment of solids that have fallen onto the blades at the rotary valve's inlet and are pinched between the rotor blades and the casing as the blade leaves the inlet opening. Sufficiently hard particles gouge the casing, providing a path for erosion to start and grow. Rotor crunch is also objectionable in some applications, such as the conveying of plastic pellets, because of the damage it does to the pellets.

Another significant problem of rotary valves is blowby. This is the escape of air from various sources into the rotary valve's inlet. Even with non-abrasive powders, blowby can sufficiently interfere with the flow of the incoming solids to render the rotary valves nonoperational. In this event, other types of airlocks such as eductors must be used, despite their much-higher operating costs. The severity of the problem is directly related to the amount of blowby, the fineness of the powders, and their adhesive properties. With sticky solids such as wet coal fines, and even dry but slightly-sticky solids such as carbon black, the turbulence in the inlet piping caused by blowby creates wall buildups that eventually shut off the inlet. Even with free-flowing fine powders, sufficiently-high blowby airflow will completely block the flow of the incoming solids.

Vents are used with conventional rotary valves to direct the pressurized air in the return-side pockets away from the inlet. Vents on the supply side would fill with solids and thus are not feasible because air leaking through the supply side of the air-lock would end up in the inlet, causing blowby.

To minimize the effect of blowby, hoppers are frequently installed at the rotary valve's inlet that allow the solids to enter on one side of the hopper while most of the blowby air leaves at the other. This is only marginally successful in most cases. The best cure is to reduce the amount of blowby airflow.

Another problem of conventional rotary valves is their pressure limit. Under most circumstances, rotary valves are limited to differential pressures of under 15 psi. Even with nonabrasive materials and reinforced construction, rotary valves are normally limited to an operating pressure of 40 psi, even though many applications for airlocks occur at higher pressures. Higher pressure causes the rotary valve's shaft to bend, which has to withstand the force created by the airlock pressure across the rotor's entire cross-section. For reasonably-sized shafts, at pressures over 40 psi, shaft bending would require a significantly enlarged gap between the blade and the casing to prevent seizure, which would increase blowby and reduce performance.

Rotary valves are also temperature limited. The higher the temperature of the incoming solids, the greater the potential temperature difference between the rotors and the casing, and thus the larger the potential gap needed to avoid seizure. As a result, lockhoppers are normally used instead of rotary valves in high temperature airlock applications. Lockhoppers are even more subject to abrasive wear than are rotary valves, and therefore are limited to even lower pressures. Rotary valves used as letdown devices, such as in coal-ash removal systems, whereby the pressure at the inlet is higher than the outlet, are similarly limited in their temperature capability.

Finally, conventional rotary valves are subject to pluggage. Fine powders such as carbon black, as well as damp materials such as wet coal, wedge themselves into the corners of the pockets, disabling the airlock by filling the pockets. Some powders are free-flowing enough to eventually fall from the pockets, but the release from the walls is slow enough to reduce the airlock's capacity.

To avoid pluggage, some rotary valves use a so-called blowthrough design instead of the more customary dropthrough designs. In the dropthrough design, the pneumatic conveying pipe is located beneath the rotary valve. In the blowthrough design, the pneumatic air passes through the rotary valve itself, entering and leaving through holes in the bottom of the casing's end plates. The velocity of the pneumatic air stream is used to dislodge the solids.

The blowthrough design can't be employed with closed-rotor rotary valves because the rotor's end disks intercept the pneumatic airflow. But closed-end rotors are required with abrasive solids. The blowthrough design is also of limited use with very sticky solids, such as wet coal or clay because the pneumatic conveying air's velocity isn't sufficient to dislodge such materials.

Rotary valves may be operated as either feeders or airlocks. Feeders are used to meter the flow of solids. When operated as a feeder, the standpipe above the rotary valve's inlet is maintained full of solids, and the pockets of the rotary valve are always full of solids. When operated as an airlock the rotary valve is operated at a higher throughput capacity than the rate of incoming solids, so its pockets are partially empty. The rotary valve's throughput capacity is controlled by its size and rotational speed.

Operation of a rotary valve with its pockets full of solids greatly increases the chances of rotor crunch. Operating the rotary valve as a feeder, and then depending on its sealing characteristics as an airlock, isn't feasible with abrasive materials or in applications where damage to the particles is unacceptable.

SUMMARY OF THE INVENTION

The present invention features a vertical-shaft rotary valve which reduces the costs associated with airlock applications. The invention can replace screwpumps used in high-pressure pneumatic conveying applications (e.g. to 30 psig), rotary valves that are used with abrasive powders at intermediate pressures (e.g. to 15 psig), and eductors used at low pressures. An advantage provided by the invention compared with screwpumps and eductors is reduced power consumption. An advantage compared with conventional rotary valves is improved reliability and reduced maintenance costs.

An enclosed-rotor vertical-shaft rotary valve is used as an airlock to inject abrasive, fine, or sticky solids into pressurized air. The invention eliminates the effect of thermal expansion on the gap between the rotor and casing, thereby making it possible to obtain much smaller gaps than before. The smallness of the gaps makes it feasible to pump clean air into the gaps without interfering with the performance of the airlock. The clean air keeps dust-laden air from entering the gaps, which eliminates the erosion that has limited the usefulness of conventional rotary valves when handling abrasive powders. By the use of two vents and a dual-pressure purge-air system, the invention also greatly reduces the blowby of air into the entrance of the airlock, which has limited the usefulness of conventional rotary valves when handling very-small-particle powders. These benefits also accrue to the injection of sticky solids into pressurized fluids. The invention extends the pressure and temperature capability of airlocks. It may be used to inject solids into fluids at lower instead of higher pressure, and may be used with fluids other than air.

In a vertical-shaft rotary valve according to the invention, solids pass through the rotor pockets in the axial direction. Sealing is accomplished at flat surfaces at the ends of the rotors. Bearings at the rotor's outer tube are used to control the rotor-stator gap. When precision bearings are used, the gap can be made very small. Because the sealing surface is flat, the rotor and stator both remain the same shape even with thermal expansion due to temperature differences between the rotor and the stator. Spring-loading keeps the rotor against the stator and thus keeps the gap therebetween at the same small size (or within a small predetermined range) regardless of thermal expansion.

As used herein, the term "vertical" generally means either perpendicular to a horizontal surface or tilted a certain amount off of the perpendicular axis, but not tilted so much as to prevent gravity flow of material through the valve. In general, a tilt off the perpendicular axis of 50 degrees or more will not allow the necessary gravity flow of material.

Clean purge-air can be pumped into the rotor-stator gaps to prevent the flow of dust-laden air from entering the gaps, thus eliminating high-velocity erosion. Accordingly, the present invention features air passages which allow purge-air to pass at pressures just above the pressure of the adjacent rotor pocket. The invention thereby minimizes air leakage to the inlet and erosion in the vicinity of the seals, thus greatly increasing the life of rotary valves used with abrasive materials.

Two vents in the rotor's top cap and a two-pressure purge-air system can be used to minimize the flow of leakage air into the inlet, greatly reducing blowby. Two vents are possible with a vertical-shaft rotary valve because the vents, located at the top of the rotary valve, are remove from the solids, which are at the bottom. In some embodiments, blowby is reduced by two orders of magnitude compared with conventional rotary valves. The greatly reduced blowby improves the reliability of rotary valves used for injecting fine powders and eliminates the need to use the costlier types of airlocks.

A wiper mechanism can be employed which sweeps incoming particles from the top of the rotor blades in order to eliminate rotor crunch.

A vertical-shaft rotary valve according to the invention offers other significant advantages over conventional rotary valves. For example, the problem of rotor flexure due to high pressure is eliminated, and therefore the rotary valve is more suitable for higher pressures than are conventional units. The invention is also less subject to pluggage than are conventional rotary valves because of the reduced tendency for wedging, the ability to employ through-flow piping with abrasive powders, and the ability to use air cannons to dislodge particularly sticky solids.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIGS. 2A and 2B are top and elevation views of the rotary valve of FIGS. 1A and 1B., of which FIG. 2B is in cross section.

FIG. 9A is a top view of the sectors of the rotary valve, as seen from above.

FIGS. 9B–9E are schematic illustrations of pressure distributions within the rotary valve.

FIG. 10 is a schematic illustration of the purge-air flows within the rotary valve.

DESCRIPTION

Figure 1A:
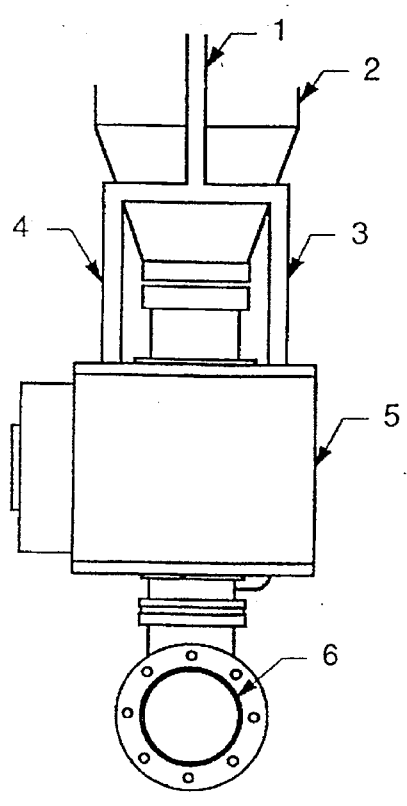
FIGS. 1A and 1B are end and elevation views of a vertical-shaft rotary valve according to the invention, shown installed.
Figure 1B:
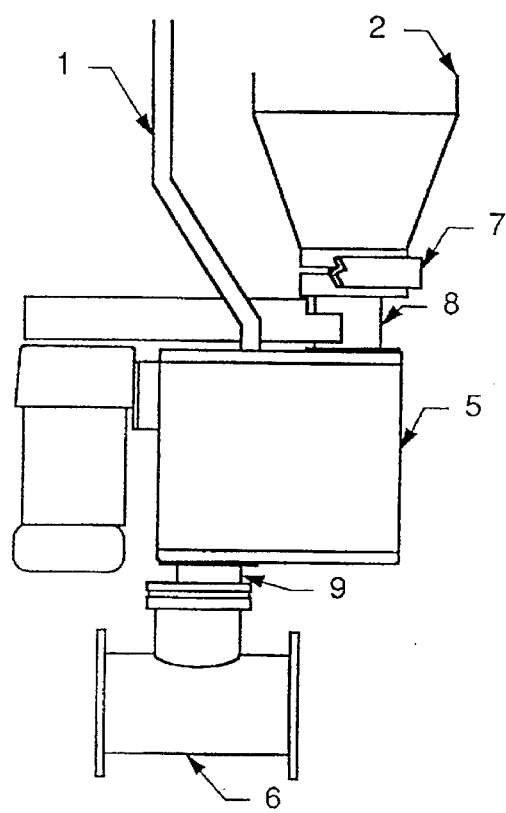

Referring to FIGS. 1A and 1B, the end view (FIG. 1A) and the elevation view (FIG. 1B) of the installed airlock are illustrated. The airlock includes a rotary valve 5 that receives solids from a downcomer pipe 2 and emits them at an outlet duct 9. The solids then fall into a pneumatic conveying pipe 6 where they are removed. Pipe 2 is connected to the rotary valve at inlet 8 by flexible seal 7 (shown partially broken away). Pipe 6 is connected to the rotary valve at outlet duct 9. When used as an airlock, the pressure in pipe 6 is higher than in pipe 2. Dusty air is emitted by the rotary valve at vents 3 and 4, collected by vent pipe 1 and piped to a dust collector where the particulates are separated and returned to pipe 2.

Referring to FIGS. 2A and 2B, the cross sectional top view (FIG. 2A) and the elevation view (FIG. 2B) of the rotary valve assembly are illustrated. The rotary valve includes a rotor 14 that is encapsulated in a casing 13. The casing includes an upper cap 24, a cylindrical sleeve 26, and a lower cap 30. Inlet duct 8 is rigidly attached to casing 13 by inlet flange 23. Outlet duct 9 is rigidly attached to the casing at cap 30. Sleeve 26 is somewhat shorter than rotor 14, which creates a gap 28 between sleeve 26 and cap 30. Gap 28 remains open regardless of differences in length between the rotor and the casing due to thermal expansion, thereby keeping thermal expansion from imposing any forces that affect the airlock's internal spacings.

Rotor 14 is mounted in casing 13 by bearing balls 19 that form upper bearing assembly 25 and lower bearing assembly 29. The vertical spaces between the rotor and the cap at each end of the rotor are gaps 21 and 31, respectively. The ends of the rotor are carefully machined to be flat and parallel to each other. The inner surfaces of each cap are carefully machined to be flat, in order to match the shape of the ends of the rotor. The caps are made thick enough to avoid significant deflection by internal pressure when the airlock is in operation.

The depths of the rotor bearing grooves 42 and 51 (FIGS. 3A and 3B) and of bearing cap bearing grooves 74 (FIG. 5B) and 99 (FIG. 6B) are all carefully machined, as is the diameter of the bearing balls 19, to allow the gaps 21 and 31 between rotor and caps to be very small (typically 0.001") and yet avoid contact between the rotor and caps during rotation of the rotor.

Figure 4A:
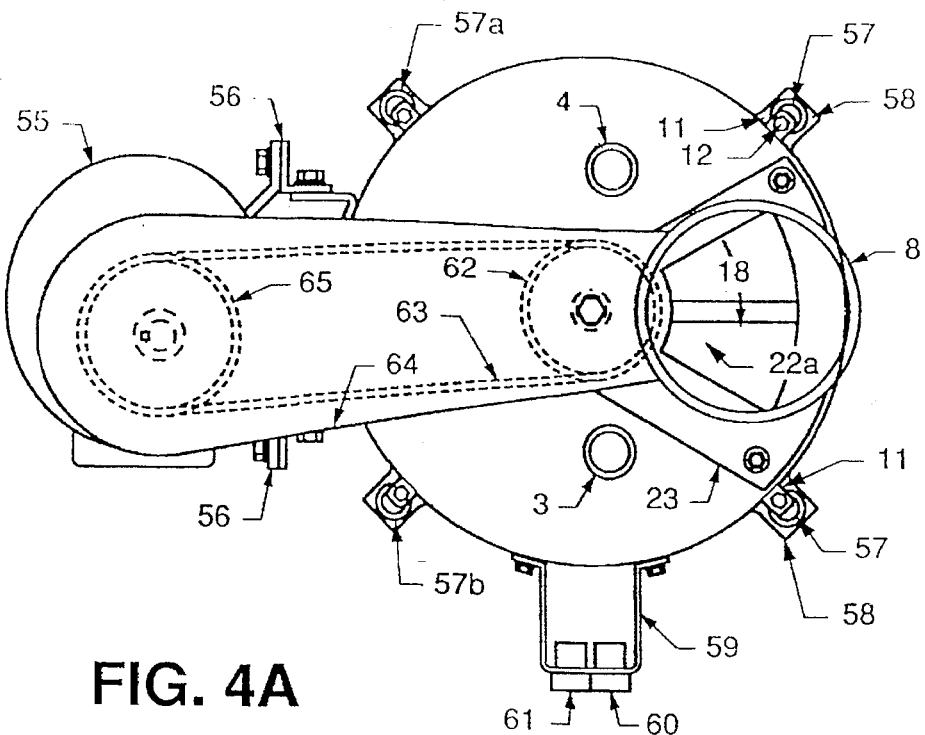
FIGS. 4A and 4B are top and elevation views of an exterior assembly associated with the rotary valve.
Figure 4B:
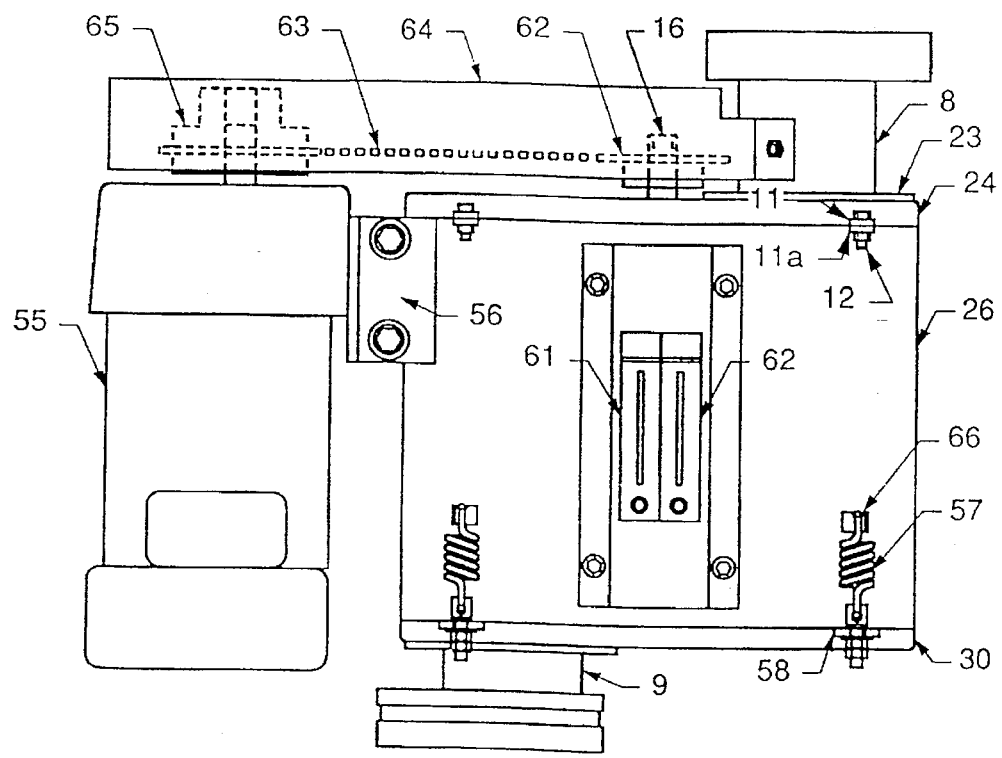

Cap 24 is rigidly attached at ears 11 to the sleeve 26 at ears 11a by bolts 12. (FIGS. 4A and 4B). Cap 30 is attached by ear 58 to sleeve 26 at spring mount 66 by springs 57 (FIGS. 4A and 4B). Bearings 25 and 29 (FIG. 2B) are held together by springs 57 which are preloaded sufficiently to keep the caps compressed against the bearing balls.

Flexible seal 7 (FIG. 1B) isolates the rotary valve from forces caused by the possible movement of pipe 2 relative to pipe 6. Such movement might overpower the force of springs 57 and open gaps 21 and 31.

Rotor 14 is rigidly attached to vertical shaft 16 which extends through cap 24 at hole 20. Gearmotor 55 (FIGS. 4A and 4B) drives rotor 14 through shaft 16 and the drive train that includes gearmotor sprocket 65 and rotary valve sprocket 62 which are connected by chain 63. The drive train is enclosed by chain-guard 64. In applications where there are oversize tramp materials in the incoming solids, gearmotor sprocket 65 may incorporate a torque-limiting clutch that nondestructively stops the rotor in the case of a jam. A proximity sensor located next to sprocket 62 detects a protrusion on its hub. The proximity sensor transmits a signal to a delay-timer relay, which shuts off the gearmotor if the sprocket 62 stops turning.

A supply of clean air is ducted to gaps 21 and 31 to prevent contamination and erosion within the airlock. Supply-side vent 3 (FIGS. 1A and 4A) and return-side vent 4 are ducted to a low-pressure receiver, such as a baghouse, to maintain the inlet side 133 of the rotary valve (FIG. 9A) near or at atmospheric pressure, which serves to minimize blowby.

In operation, solids enter the rotary valve by gravity through inlet duct 8 (FIG. 2B) and opening 22 and fall into pockets 17. The rotation 18 of rotor 14 moves the solids from the inlet to the outlet, where they leave the rotary valve by gravity through outlet opening 32 and outlet duct 9.

Figure 3A:
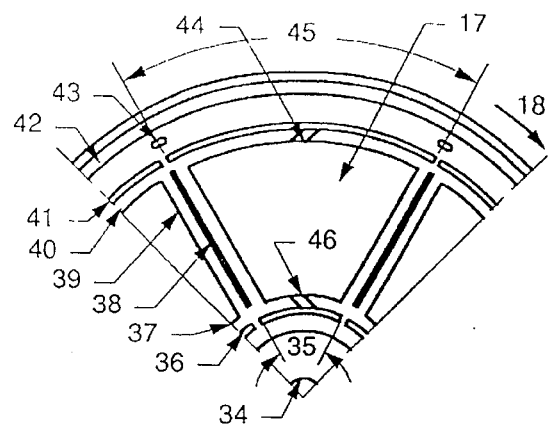
FIG. 3A is a 90° segment of the top view of the rotor.
Figure 3B:
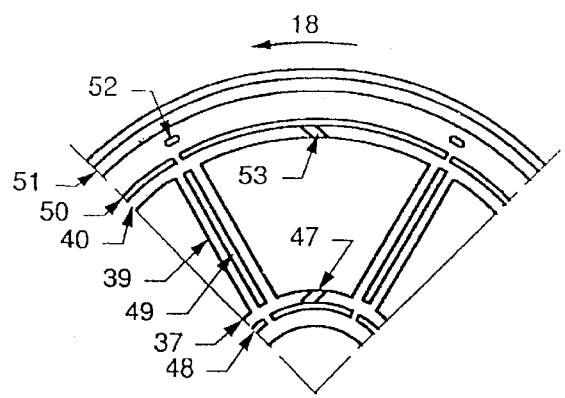
FIG. 3B is a 90° segment of the bottom view of the rotor.
Figure 3C:
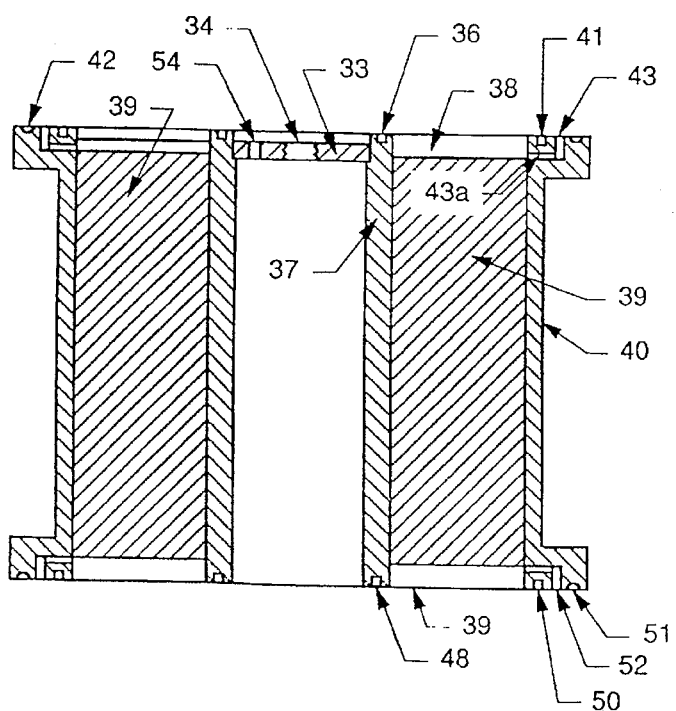
FIG. 3C is an elevation view of the rotor in cross section.

Referring to FIGS. 3A–3C, the top view (FIG. 3A), the bottom view (FIG. 3B) and the cross section-elevation view (FIG. 3C) of rotor 14 are illustrated. Rotor 14 includes an inner tube 37, radial blades 39, and an outer tube 40, all the same height and each rigidly attached to their adjacent elements. The inner tube, radial blades, and outer tube combine to form six equally-sized pie-shaped pockets 17 that are open at the top and bottom and fully enclosed on the sides. Near its top, tube 37 has an integrally-attached hub 33. Hub 33 contains a threaded hole 34 at its center for the attachment of shaft 16 (FIG. 2B). It also contains a vent-hole 54.

Rotor 14 contains air passages at its top, consisting of grooves 36, 38, and 41 (FIG. 3A) that supply purge-air to keep powder away from gap 21 at the rotor's inner tube, blades, and outer tube, respectively. Groove 43 supplies air to groove 38 through internal passage 43a (FIG. 3C). The rotor also contains grooves 44 and 46 to prevent the accumulation of particulates in gap 21 at the outer and inner tubes, respectively. The top of rotor 14 also contains bearing groove 42. Similarly, at the bottom of the rotor (FIG. 3B), grooves 47–50, 52 and 53 provide air passages to keep dust away from various parts of gap 31. The bottom of the rotor also contains bearing groove 51.

Describing the upper cap, the top view (FIG. 5A) and the bottom view (FIG. 5B) of cap 24 are illustrated. Cap 24 contains opening 22 which is directly beneath the bottom of inlet 8. Opening 22a in inlet 8 is defined by arc 68, the outer radius of tube 37 and the inner radius of tube 40. Opening 22 in cap 24 is defined by arc 78, the outer radius of tube 37, and the inner radius of tube 40. Arcs 68 and 78 are both typically 60°.

Cap 24 contains cavity 79 which is an extension to opening 22 and in which a wiper assembly 165 (FIG. 15) is mounted. The wiper assembly is sealed within the airlock by inlet flange 23, which extends beyond the edges of cavity 79 and is rigidly attached to the top of cap 24.

Cap 24 contains groove 83 which feeds vent pipe 4 at the return side 131 (FIG. 9A) of the airlock. Groove 83 is designed to minimize erosion, as follows. As the rotor turns and the blades pass return groove 83, there is a momentary burst of velocity as the pressurized air in the pocket is released. Even though the pocket is nominally free of solids at this point, erosion might occur from the entrapment of any dust remaining in the pocket. To minimize the velocity and attendant erosion, groove 83 is made the full length of the blades and its leading edge is aligned with the trailing edge of the blade as it approaches the groove. Similarly, cap 24 contains groove 80 that feeds vent pipe 3 at the supply side 133 of the airlock.

Figure 18:
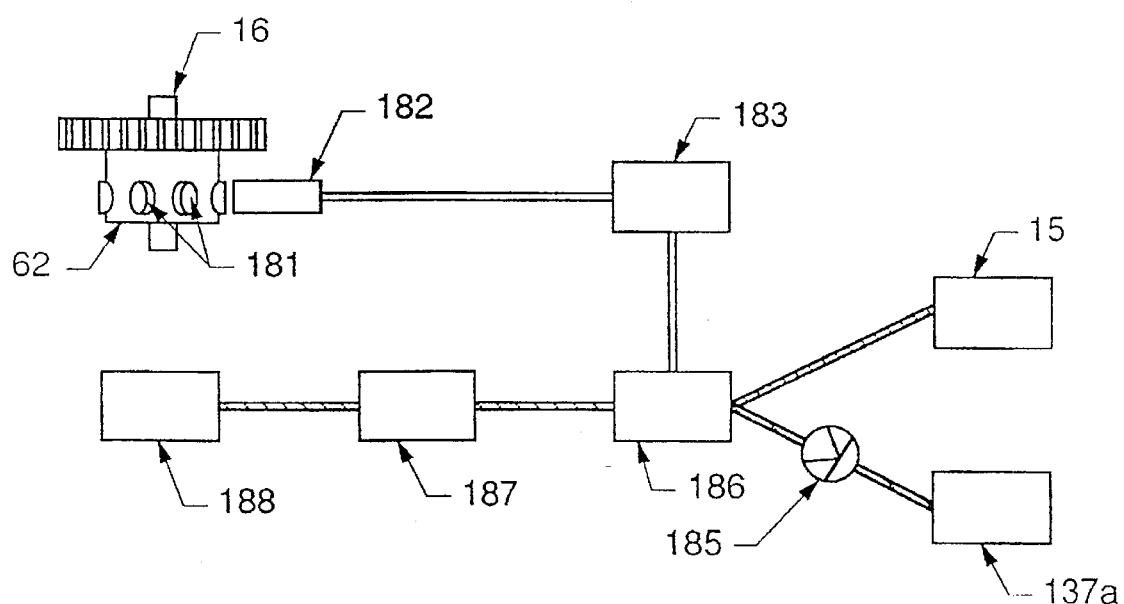
FIG. 18 is a schematic diagram of an air cannon system to dislodge sticky solids from the pockets.

Cap 24 also contains bearing groove 74, ears 11 for attaching cap 24 to cylindrical sleeve 26 (FIG. 2B), shaft hole 20, and hole 15 for attaching the air cannon nozzle (FIG. 18). It also contains hole 73 used to position the cap with respect to the casing 27 by use of an alignment pin.

Figure 5A:
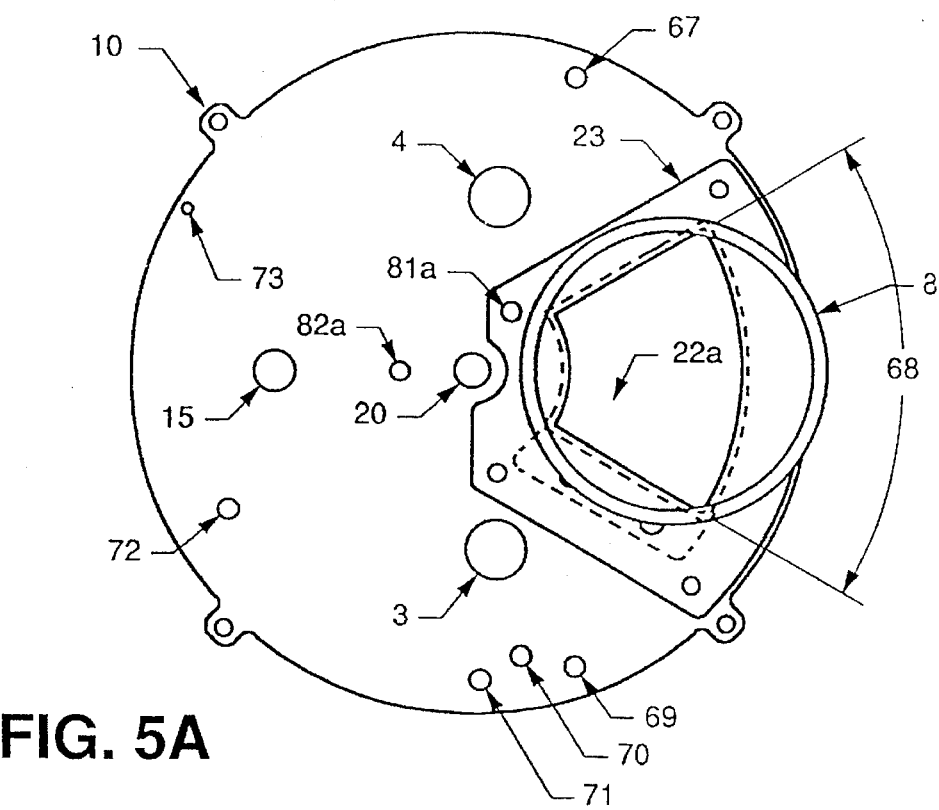
FIGS. 5A and 5B are top and bottom views of an upper cap of the rotary valve.
Figure 5B:
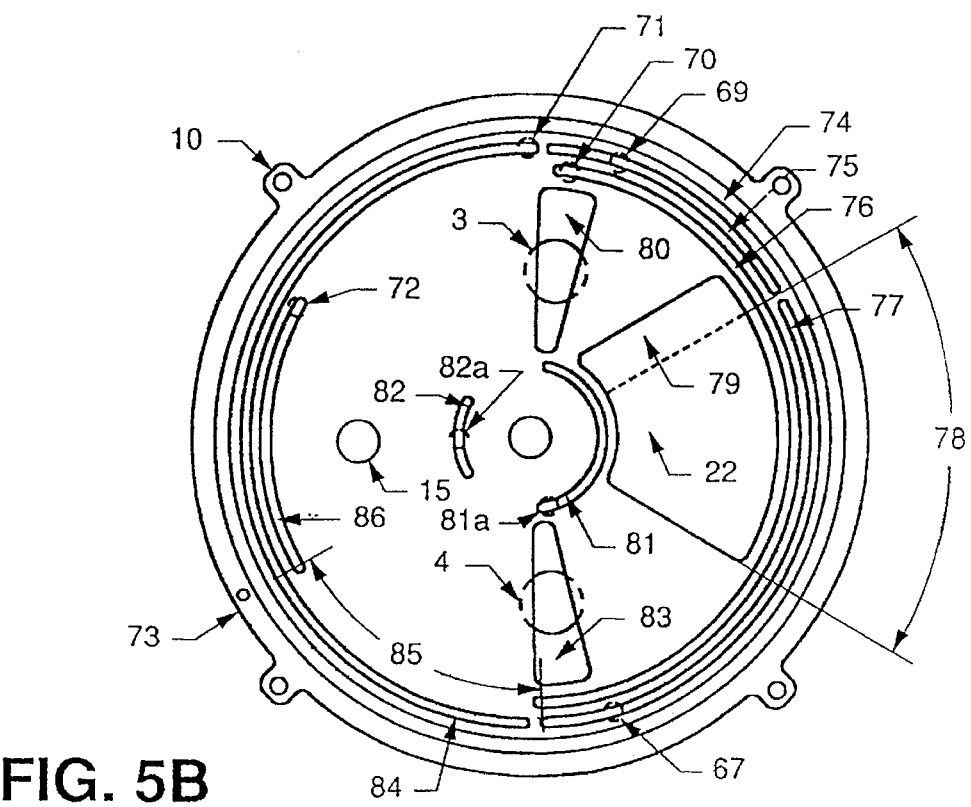

Cap 24 also contains the grooves that provide passages for supplying purge-air to the rotor (FIG. 5B). These include grooves 82, 84 and 86 that supply purge-air to outlet side 134 of the cap, which grooves are connected to inlet ports 82a, 71, and 72 respectively. Purge-air is supplied to the rotor on the inlet side 132 (FIG. 9A) of cap 24 by grooves 75, 76, 77 and 81, which are connected to inlet ports 69, 70, 67, and 81a, respectively.

Describing the lower cap, the top view (FIG. 6A) and the bottom view (FIG. 6S) of cap 30 are illustrated. Cap 30 contains opening 32 which is the same size and shape as the top of outlet duct 9. Opening 32 is defined by arc 103, the outer radius of tube 37 (FIG. 3C) and the inner radius of tube 40. Arc 103 is typically 60°. Cap 30 also contains ears 58 for attaching springs 57 to casing 26, (FIG. 4B), and bearing groove 99. It also contains hole 91 that is used with an alignment pin to position the cap with respect to the casing. Together with the alignment pin in hole 73 in the upper cap, the pins serve to align the two caps to each other in the circumferential direction.

Figure 6B:
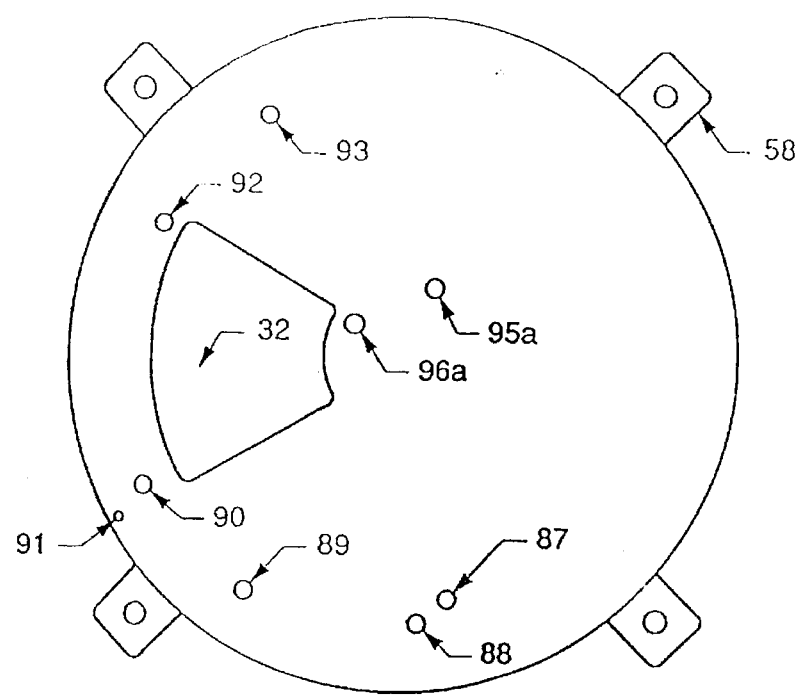
FIGS. 6A and 6B are top and bottom views of a lower cap of the rotary valve.

Cap 30 also contains grooves that provide passages for supplying purge-air to the rotor (FIG. 6B). These include grooves 94, 96, and 100–102 that supply purge-air to outlet side 134 (FIG. 9A) of the cap, which grooves are connected to inlet ports 93, 96a, 89, 92, and 90, respectively. Purge-air is supplied to grooves on the inlet side 132 (FIG. 9A) of cap 30 by grooves 97 and 98, which are connected to inlet ports 87 and 88, respectively.

The rotary valve's bearing assemblies 25 and 29 (FIGS. 2A and 2B) are outboard bearings. An outboard bearing is defined as one whose pitch diameter is larger than the outside diameter of pockets 17 but smaller than the inside diameter of cylindrical sleeve 26. Outboard bearings are used to withstand the tilting moments caused by the eccentric distribution of pressures within the rotary valve. Inboard bearings would require much larger bearing surfaces, by over an order of magnitude, to achieve the same stiffness. In all but the lowest-pressure applications, such large bearings wouldn't fit in the available space.

Bearings 25 and 29 (FIG. 2B) are turntable bearings, which are defined as bearings whose height is unaffected by either thrust loads or radial loads. Thrust loads are defined as forces parallel to the rotor's axis, while radial loads are forces perpendicular to the rotor's axis.

Figure 8A:
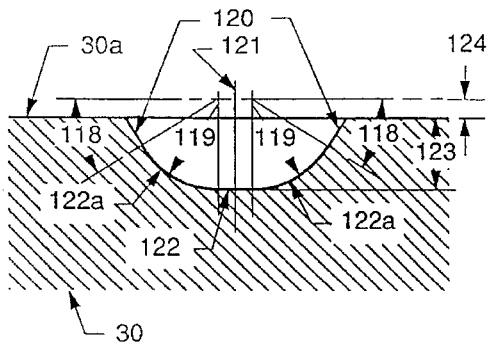
FIG. 8A is a cross-section of a bearing groove.
Figure 8B:
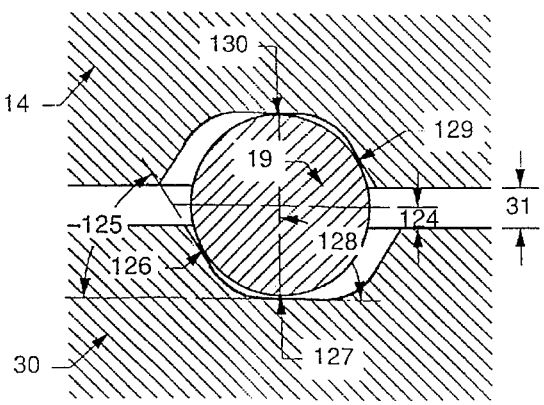
FIG. 8B is a cross section of a bearing assembly.

An illustration of lower bearing assembly 29 (FIG. 2B) is shown in FIGS. 8A and 8B. The bearing groove profile is shown in FIG. 8A, while the assembly is shown in FIG. 8B. The same profile is used in all four bearing grooves of the rotary valve. The groove consists of flat surface 122 which is centered on bearing pitch diameter 121. Flat surface 122 is located at depth 123 below the top surface 30a of cap 30. Depth 123 is equal to the radius of bearing ball 19, minus clearance 124. Clearance 124 is half of the gap height between the rotor and cap, such as gap 31 (FIG. 2B). Gaps 21 and 31 are designed to just eliminate contact between the rotor and the caps when the rotary valve is in operation.

Adjacent to each end of flat surface 122 (FIG. 8A), and tangent to it, is a curved surface 122a, whose radius 119 is slightly less than that of bearing ball 19. Each curved surface 122a extends from the end of surface 122 to a circle defined by angle 118. Here, each curved surface is joined by a conical surface 120 which is tangent to the top of curved surface 122a and extends to surface 30a.

FIG. 8B illustrates the appearance of the bearing assembly in use. Upper bearing assembly 25 is the same as that shown in FIG. 8B, except that it is inverted. The bearing assembly includes bearing balls 19 that separate the grooves and may include spacers to separate the balls in the circumferential direction (not shown) to reduce wear. The grooves in FIG. 8B are offset in the horizontal direction due to the thrust imposed on the bearing by chain 63 and shaft 16.

The thrust load created by springs 57 creates contact between the bearing balls and the grooves at points 127 and 130. Since radius 119 of the curved surfaces 122a is less than that of the balls, the points of contact between the balls and the groove are on flat surfaces 122, and the contact angle 128 is 90°. A contact angle of 90° keeps the balls from riding up on the side of the grooves with variation of the thrust and radial loads, as would occur at other contact angles. Flat surface 122 is incorporated into the groove to provide a contact angle of 90° even if the pitch diameters of the mating bearing grooves differ slightly due to the effects of thermal expansion or manufacturing tolerances.

The radial loads on the bearings creates contact between the bearing balls and the grooves at points 126 and 129. The gap height 31 remains unchanged despite the imposition of radial loads as long as the ratio of radial loads to thrust loads is less than the tangent of angle 125. This condition is readily met with the forces imposed on the bearings and with cone angles 125 that are used, which exceed 60°. Using contact angles 125 of less than 90° makes the bearing groove more manufacturable and reduces the stress concentrations that would otherwise exist at contact points 126 and 129.

Figure 6A:
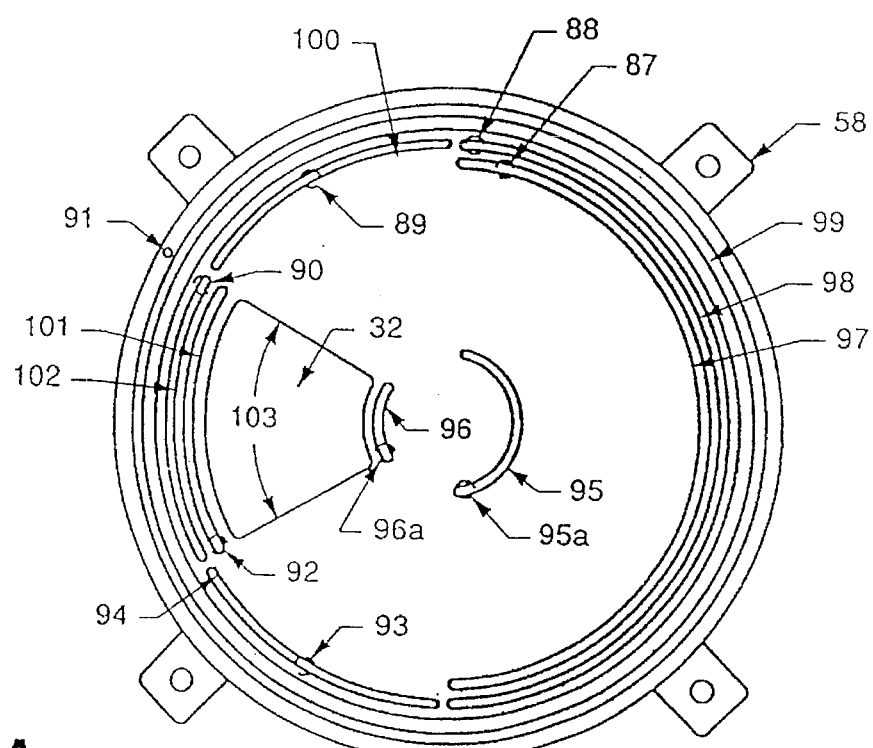

Referring to FIGS. 9A–9E, the pressure distribution within the rotary valve is schematically illustrated. The pressure distribution affects the design of both the mechanical elements, such as the springs and bearings, and the flow distribution of the purge-air system. For ease of explanation, the rotary valve's casing, as seen from the top, is divided into six equally-sized sectors. Sector A (FIG. 9A) corresponds to the location of opening 22a in inlet 8 (FIG. 4A) Sector D corresponds to the location of opening 32 of lower cap 30 (FIG. 6A).

FIG. 9A also identifies the sides of the rotary valve. The inlet side 132 refers to sectors A, B, and F. The outlet side 134 refers to sectors C, D, and E. The supply side 133 refers to lower half of the rotary valve as shown in FIG. 9A, the section of the rotary valve in which the pockets are moving solids from the inlet to the outlet. The return side 131 refers to the top half of the rotary valve as shown in FIG. 9A, the side of the rotary valve in which the pockets are empty.

FIG. 9B shows the pressures in pockets 17 (FIG. 2A) as they pass through stationery sectors A through F. It shows that pockets passing through sectors A, B, and F are always at low pressure (L). The pockets passing through sectors B and F are kept at low pressure by vents 3 and 4 (FIG. 4A), as well as exposure to the inlet 8.

The pocket passing through sector D is always at high pressure (H), while pockets passing through sectors C and E alternate between high and low pressures (H-L), one pocket always being at high pressure when the other is at low pressure. Accordingly, the low-pressure side of the airlock is defined as segments A, B and F, while the high-pressure side is segments C, D, and E.

The pressure distribution in the pockets is shown in greater detail in FIGS. 9C through 9E. FIG. 9C shows the pressure in the pockets at an intermediate rotor position. FIG. 9D shows the pressure in the pockets just before one of the blades passes over the upstream edge of the sector D (or, outlet opening 32). FIG. 9E shows the pressure in the pockets just after this event. Springs 41 (FIG. 4B) counteract the forces caused by the air pressure within the airlock. Typically, there are four springs, equally spaced around the perimeter of the casing (FIGS. 4A and 4B). The springs 57a and 57b on the outlet side 134 are used to counteract the pressures there, while the springs on the inlet side 132 are needed only to keep the bearings tight against their grooves. These springs need be no stronger than what is required to keep the airlock tight, (plus a safety margin), in order to minimize the stress on the bearings.

Purge-air is clean air that is pumped to gaps 21 and 31 to protect the airlock from damage by particulates. The purge-air system includes an external network that terminates at the inlet ports in the caps. These are connected to an internal network that ducts the purge-air to the cap grooves, rotor grooves, and horizontal gaps between the rotor and the caps. The purge-air serves different functions in various regions of the airlock, as follows. The purge-air injected at grooves 36 and 48 of inner tube 37 (FIGS. 3A–3C) keeps dust-laden air from entering the gap between the tube and the caps and causing erosion. The purge-air injected at groove 38 at the top of the blades 39 keeps dust-laden air from passing over the tops of the blades. With abrasive powders, both the blades and cap 24 (FIGS. 2A and 2B) would otherwise erode.

The purge-air injected at grooves 49 at the bottoms of blades 39 (FIGS. 3B and 3C) sweeps away fine particles from the front of the blades and prevents their entrapment between the blade and the cap due to the rotor's motion. This prevents rotor 14 (FIG. 2B) from riding up on entrapped particles which would enlarge gap 31 thereby increasing blowby. Entrapment would also erode the leading edge of the blade bottom, forming a radius there that would cause the rotor to ride-up on ever-increasingly-large particles until failure occurred. The purge-air injected at grooves 41 and 50 of outer tube 40 (FIGS. 3A–3C) keeps dust-laden air from entering the gaps between the tube and the caps, eliminating both the erosion and contamination of the bearings that would otherwise occur.

The purge-air system is designed to provide sufficient clean air to protect all sections of the gaps. Excess purge-air flow increases blowby and the entrainment of dusty air into the vent system, both of which degrade the performance of the airlock. To achieve reliable but minimum purge-air flow, two principles are employed: flow control and independent supply. Both principles are illustrated in FIG. 10. Flow control means that, in the low-pressure sectors, the flow rate of the purge-air is controlled, whereas in the high-pressure sectors (with one exception), the pressure is controlled. Control of the flow rate is achieved with a pressure-reducing device, such as an orifice, which places a restriction upstream of the grooves distributing the purge-air to the gaps. The restrictions each produce a pressure drop that is many times higher than the pressure drop at outlet of the grooves, such as in the gaps adjoining the grooves. When the pressure is controlled, there is no such pressure-reducing device. The principle of independent supply means that the ducting to the inner and outer rings is separate from the ducting to the blades, and that segments of each groove may be supplied separately.

The reason for the principle of flow control is as follows. In the low-pressure system, the pressure difference across the gap is the same in both directions: from the grooves to the pockets, and from the grooves to the outside of the rotary valve. The amount of purge-air ideally is no more than that needed to blow small particles away from the gap. The only particles that need to be swept away are those smaller than the gap itself. Typically, a velocity of 20 ft/sec at the gap's outlet is more than enough to blow away any particles small enough to fit in the gap, equivalent to a leakage of 0.1 CFM per foot of gap perimeter per 0.001" of gap. Higher airflows are undesirable because they increase the blowby. In order to achieve this flowrate, the pressure differential across the gap is very small—less than 0.01 psi. Controlling such a low pressure differential would require use of delicate instruments, which are costly and unreliable. Instead of controlling the pressure to the low-pressure the grooves, then, the flow to each groove is controlled, using a pressure regulator and orifice to each groove, as is described in greater detail below.

The opposite approach is used with the high-pressure system. There, the pressure difference from the grooves to the pockets is much lower than the pressure difference from the grooves to the exterior of the airlock (or, across the tops of the blades.) This means that the flowrate into the airlock pockets is a small fraction—typically 5% or less—of the airflow out of the airlock. Controlling total airflow to the high-pressure system thus provides no control over the critical 5%. For example, a 10% increase in the flow to the outside (created by a slight increase in the size of gap 21) would create a 5% deficiency of purge-air flow into the pockets, creating the reverse flow of dust-laden solids into the gap which the system was intended to eliminate.

Therefore, the high-pressure purge-air flow is controlled by maintaining the grooves' pressures slightly above that of the airlock's pressures. While this may create a greater flow into the airlock's pockets than is optimal from the point of keeping solids from entering the gap, the excess purge-air flow is all vented, either into the outlet or into vents 3 and 4. In neither case does the excess air reach the inlet, where it would reduce the airlock's performance by increasing the blowby.

The reason for the principle of independent supply is as follows. The gaps 21 or 31 (FIG. 2B) adjacent to the rotor grooves 36, 41, 48, and 50 (FIGS. 3A and 3B) are very small for the entire revolution of the rotor, which restrictiveness limits their purge-air flow rate. For most of the rotor revolution, the gaps between the blade grooves 38 and 49 and the caps are similarly restrictive and flow-limiting. However, as the blades pass into open areas, such as opening 22 or 32 (FIG. 2B), vent groove 80 and 83 (FIG. 5B), or wiper groove 79, the gaps are eliminated.

In all but very-low-pressure applications the purge-air flow rate from grooves 38 and 49 becomes excessive, starving the other gaps of their supply of purge-air and causing reverse-flow there. To prevent this, external flow restrictions are required in the passages leading to the blade grooves as they pass the open areas. The external restrictions are used only as the blades pass the openings; elsewhere, they must be removed, else the bleed air won't prevent the flow of dusty air over the blade ends.

Figure 11:
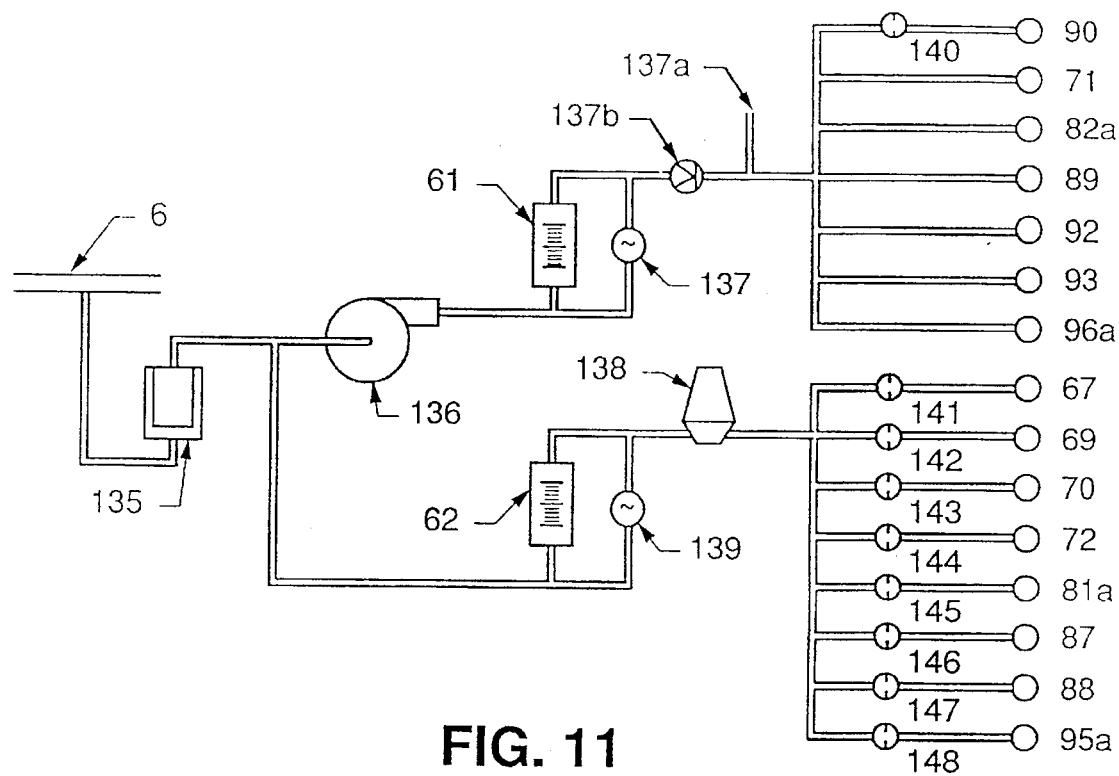
FIG. 11 is a schematic illustration of the purge-air system outside the rotary valve.

Referring to FIG. 11, the external portion of the purge-air system is schematically illustrated. The purge-air is supplied by pneumatic-conveying line 6 at an inlet (not shown) which is located upstream of rotary valve outlet 9 (FIG. 1B). The purge-air is ducted through filter 135 and divided into the flowpath to the high-pressure grooves (above) and the flowpath to the low-pressure grooves (below) The high-pressure flowpath includes blower 136, flowmeter 61, pressure switch 137, check valve 137b, and a manifold which feeds the inlets 90–96a at the right-upper portion of FIG. 11. The inlet ports 90–96a are in the caps (FIGS. 5A and 6A.) Flow restriction 140 upstream of inlet 90 provides the flow control for groove 49 as it passes over outlet opening 32.

The low-pressure flowpath includes flowmeter 62, pressure switch 139, pressure regulator 138, and a manifold that feeds flow restrictions 141–148 and inlet ports 67–95a. A low-pressure signal by pressure switches 137 or 139 indicates an insufficiency of purge-air flow, whereas a high-pressure signal by pressure switch 137 indicates an excessive leakage path such as one due to a widened gap 21 or 31. The signals are used to shut down the airlock or sound an alarm.

Figure 7A:
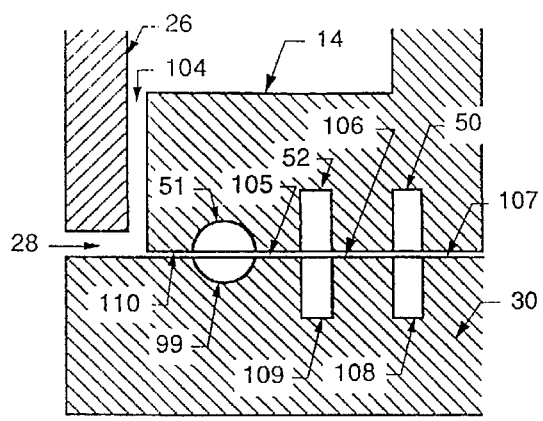
FIG. 7A shows a cross section in the vicinity of the lower bearing.
Figure 7B:
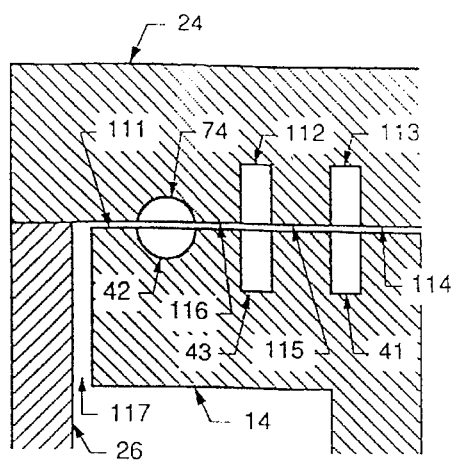
FIG. 7B shows a cross section in the vicinity of the upper

The internal portion of the purge-air system is illustrated in FIGS. 7A and 7B. FIG. 7A shows the purge-air grooves at the outer radius of lower cap 30 and the bottom of rotor 14. The purge-air to grooves in the vicinity of the outer tube 40 (FIG. 3C) enter the cap through inlet ports such as 87 or 92 (not shown) and into groove 108. Groove 108 may be either 97 or 101 (FIG. 6B), depending on the location around the circumference. Purge-air from groove 108 flows to pockets 17, either directly through gap 107, or first to rotor groove 50 and then through gap 107.

The purge-air to the groove at the bottom of the blades, groove 49, enters through groove 109 (FIG. 7A), which is representative of grooves 98 and 102 (FIG. 6B) depending on the location around the circumference. Some of the purge-air from groove 109 flows into groove 52, from which it is ducted to groove 50 (FIG. 3C). The remainder of the purge-air from groove 109 flows into gap 52, past bearing grooves 51 and 99, and out of the rotary valve through gap 28.

FIG. 7B shows the corresponding purge-air grooves at the upper cap 24 and the top of rotor 14. The flow paths correspond to those described above for FIG. 7A, except that flow leaving through gap 111 leaves the rotary valve through casing 117 and vent hole 27 (FIG. 2B). Purge-air supplied at inner tube 37 (FIG. 3C) enters upper cap 24 (FIGS. 5A and 5B) at ports 81a and 82a, flows to grooves 81 and 82, respectively, and then to rotor groove 36 (FIG. 3A). Some air flows radially outward through gap 21 into the pockets 17, while the remainder flows radially inward through gap 21 and leaves the rotary valve through hole 20 (FIG. 2). Similarly, purge-air at to the inner tube at the lower cap enters through ports 95a and 96a, to grooves 95, 96, and 48. It leaves through gap 31 to pockets 17, as well as through vent hole 54 and hole 20.

The layout of the grooves around the circumference of the airlock causes each rotor's groove pressure to always be referenced to the pocket pressure: when a particular pocket is at low pressure, the adjacent circumferential groove segment in the rotor is also at low pressure, and vice versa. For example, pockets in sectors A, B, and E in FIG. 9A are always at low pressure. To accomplish the matchup between the pressure in the groove with the pressure in the pockets, the low-pressure upper-cap grooves 76, 77, and 81 (FIG. 5B) supply purge-air to upper rotor grooves 36, 40, and 43, respectively, as pockets pass through these sectors.

On the contrary, the high-pressure upper-cap grooves 82, 149, and 86 supply rotor grooves 36, 40, and 43, respectively, as the pockets pass sectors C, D, and E. Similarly, the lower-cap grooves supply the rotor grooves with the purge-air at the appropriate pressure as the pockets pass from one pressure zone to another. Arc 85 (FIG. 5B) separating the high-pressure groove 86 from the low-pressure groove 76 is somewhat less than an arc 45°, to avoid any interruption of purge-air flow as the rotating groove passes from the low-pressure to the high-pressure source. The overlap between arcs 85 and 45 is only about 3°, enough to allow some transfer of purge-air from groove 86 to groove 76 during the transition, but not enough air to starve the remaining system. The same concept, of using a limited amount of overlap between the high-pressure and low-pressure purge-air grooves, is used in all of the other transfer points in the rotary valve.

Figure 12:
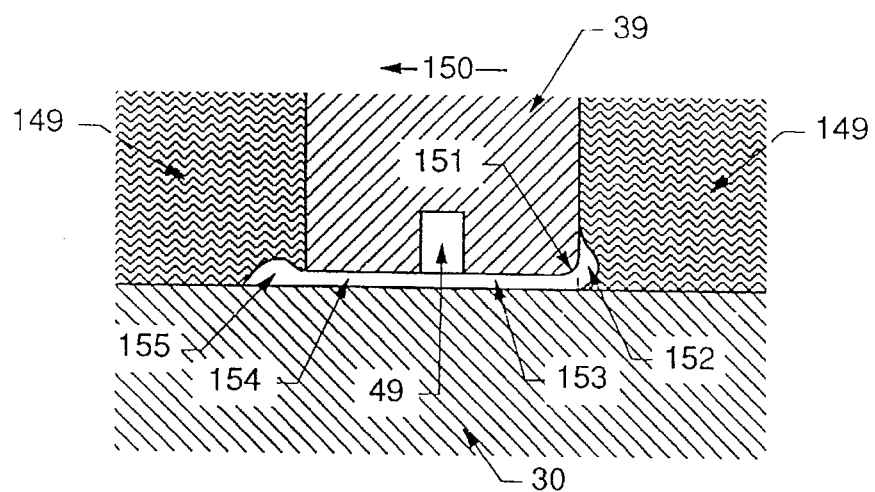
FIG. 12 is a cross-sectional diagram of the bottom of a blade and its surroundings.

Referring to FIG. 12, a cross-section of the bottom of a blade 39 and its surroundings are illustrated. The movement 150 of the blade is from right to left. FIG. 12 shows a blade on the supply side 133 (FIG. 9A) of the airlock where beds of solids 84 fill the bottoms of the pockets 17 (FIG. 3A) on each side of the blade.

Particles larger than the height of gap 154 are moved by the force of the blade. The left bottom corner of the blade is sharp, to minimize the size of particles that could be trapped between the blade and the cap and force the rotor to ride up on them. Particles smaller than gap 154 are kept out of the gap by the purge-air, which enters at groove 49, flows through gap 154, and forms air bubble 155 in the bed of solids.

Purge-air from groove 49 also leaves through gap 153 where it enters the bed of solids 149, forming air bubble 152. The right bottom corner of the blade has a radius 151, which expands the cross-section of the gap before the purge-air reaches the bed of solids, thereby reducing the air velocity and the attendant erosion. A radius is used instead of a chamber at the bottom right of blade 39 to produce the Coanda effect, whereby the purge-air follows the wall as it decelerates instead of jetting out into the bed of solids, further minimizing the erosion caused by the purge-air flow.

Figure 13:
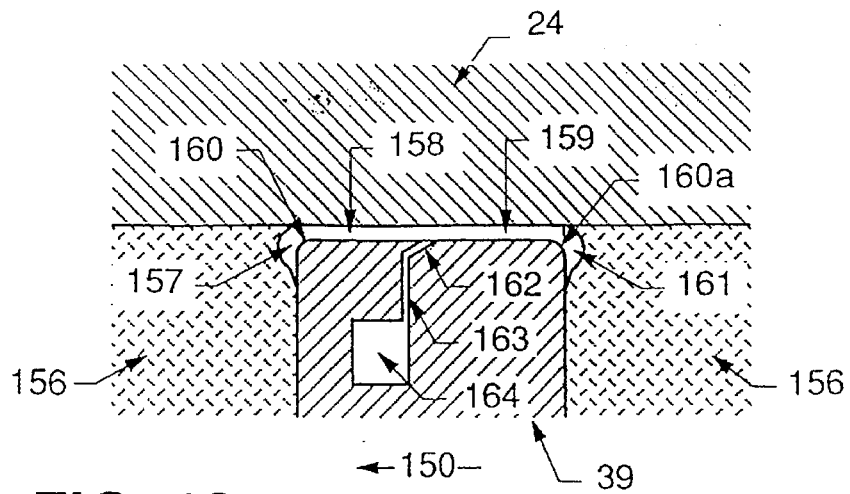
FIG. 13 a cross-sectional diagram of the top of a blade and its surroundings.

Referring to FIG. 13, a cross-section of the top of a blade 39 is illustrated. The direction 150 of the blade is from right to left. The atmosphere surrounding the blade is dusty air 156. Purge-air is emitted from the center of the blade.

Figure 14A:
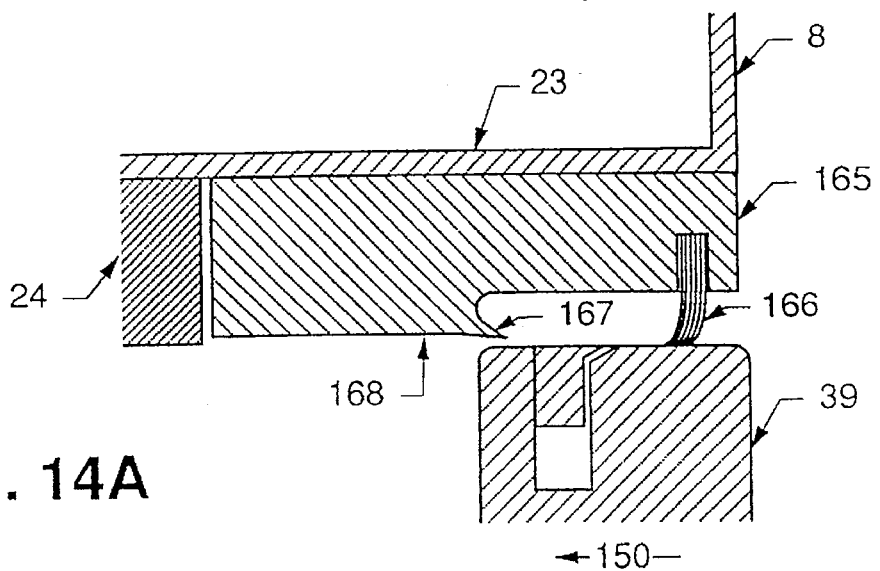
FIGS. 14A and 14B are schematic diagrams of a wiper assembly for removing dry powders.

One function of the purge-air is to prevent the flow of dust-laden air from entering gaps 158 and 159, to avoid the high-velocity erosion that would otherwise occur with abrasive powders. When the blade is passing through sector C (FIG. 9A) on the supply-side 133 of the rotary valve, the high-pressure is to the left of the blade. The opposite is true when the blade is passing through sector E on the return-side 131 of the rotary valve, so the purge-air must block the flow of dust-laden air in both directions. Another function of the purge-air is to aid in the removal by the wiper 165 (FIG. 14B) of particles resting on the tops of the blades as they leave the inlet. The purge-air enters the blade horizontally through passage 164 and leaves through slots 163 and 162, all of which are the full length of the blade. Slot 162 is swept backwards to prevent its being plugged as the blade passes under openings 22 (FIG. 5B) and wiper brush 166 (FIG. 14A). Slots 162 and 163 are made restrictive enough to distribute the flow of purge-air uniformly along the length of the blade, and to provide sufficient velocity to clear away any fine particles from the vicinity of the slot's outlet.

Some of the purge-air emitted from slot 162 flows through gap 158, past radius 160, and forms air bubble 157. The remaining purge-air flows through gap 159, past radius 160a, and forms air bubble 161. Radii 160 and 160a are used to create the Coanda effect whereby the purge-air follows the contour of the blade and accelerates gently at the wall instead of jetting into the dusty-air, thereby minimizing erosion.

Figure 14B:
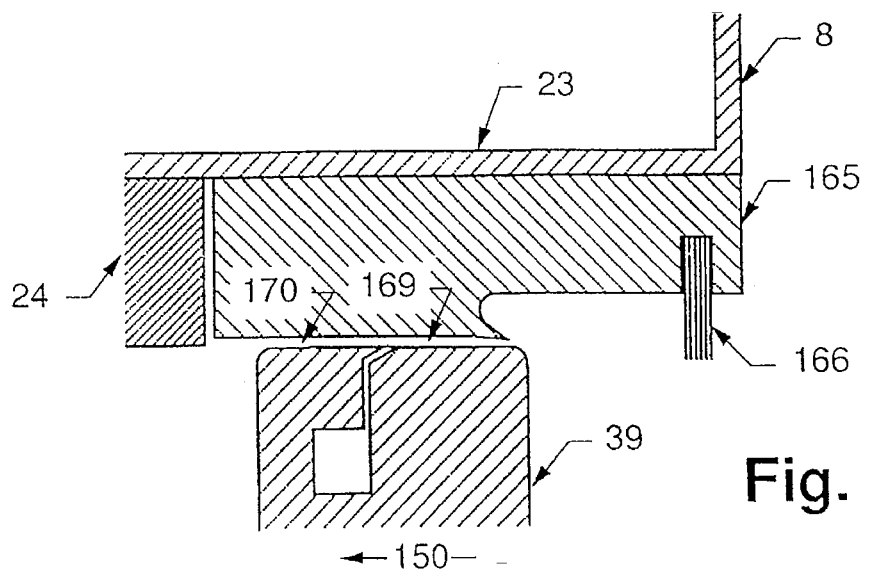
Figure 15:
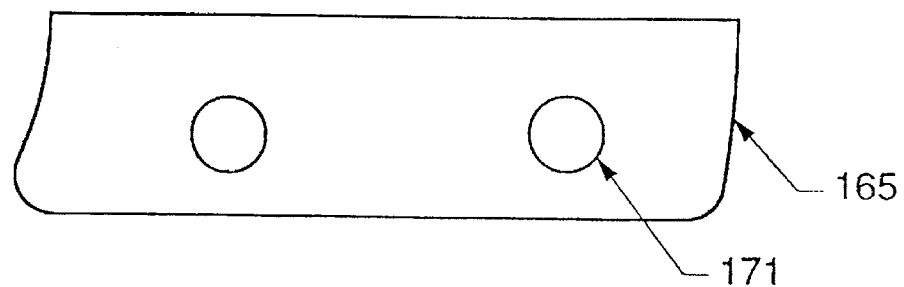
FIG. 15 is a top view of a wiper assembly.
Figure 16:
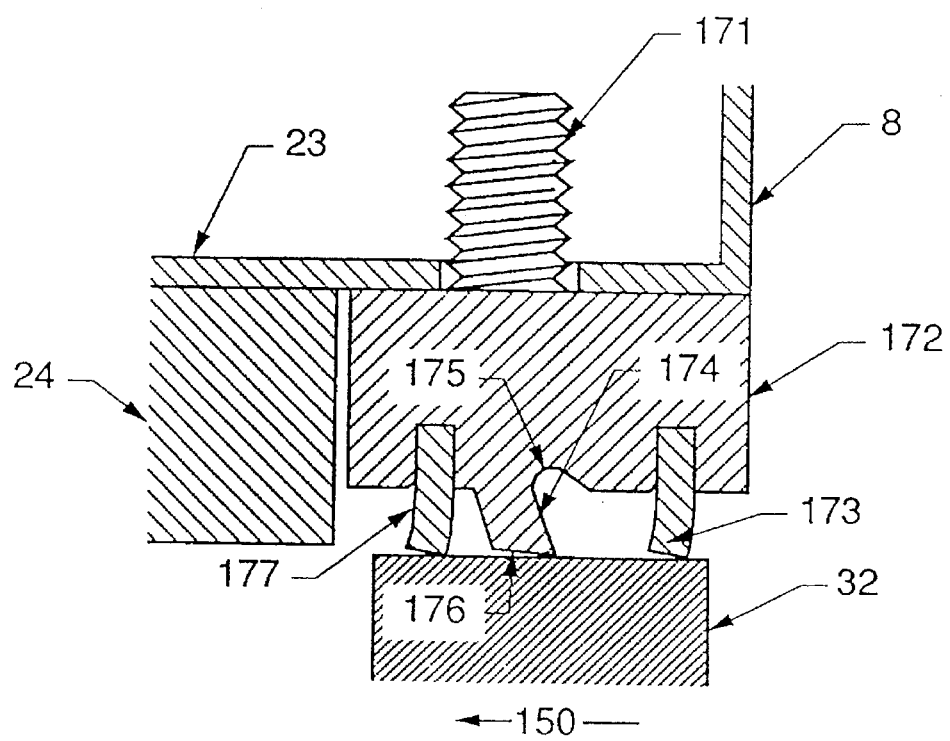
FIG. 16 is a schematic diagram of a wiper assembly for removing sticky solids.

Referring to FIGS. 14A, 14B, 15 and 16, wiper assemblies for cleaning are illustrated. The wiper assemblies are used to remove the particles lying on the top of a blade 39 that have landed there when the blade was passing under inlet opening 22, thereby eliminating rotor crunch. Wiper assemblies may be omitted if the material handled by the airlock is unabrasive or if the increased maintenance caused by their elimination is acceptable. FIGS. 14A and 14B are end-views in cross section of wiper assembly 165, while FIG. 15 is a top view of both wiper assembly 165 and wiper assembly 172. Both assemblies are mounted in extension 79 of cap 24 (FIG. 5B) by studs 171 (FIGS. 15 and 16).

The wiper assembly of FIGS. 14A and 14B is designed to handle dry, non-sticky solids. Movement 150 of the blade in FIGS. 14A and 14B under the wiper is from right to left. As the blade approaches the wiper assembly, it encounters brush 166 which sweeps the particles into the pocket at the right. As the blade progresses, it encounters knife 167 that scrapes remaining particles into the pocket. The clearance between the knife and the blade is only a few thousandths of an inch, so only very small particles can remain on the blade after the first two stages of removal. The knife includes relief angle 168 to eliminate the gouging of the top of the blades. As the blade moves further along (FIG. 14B), it forms gaps 169 and 170 between the blade and cap 242. The velocity of the purge-air emitted from gaps 169 and 170 blows away any particles remaining on the top of the blades.

Wiper assembly 165 is unsuitable for use with wet or sticky solids, as brush 166 would fill up and become nonfunctional. Wiper assembly 172 (FIG. 16) is used for such materials. It includes wiper 173, knife 174, and wiper 177. Wipers 173 and 177 are made of abrasion-resistant elastomers that are deflected by the motion of the blade. Wiper 173 brushes away most of the material on the blade. Knife 174 is close-fitting to blades 32 and scrapes away most of the remaining material. Wiper 177 polishes the top of the blade, removing any remaining material. Knife 174 contains cavity 175 which directs shavings of scraped solids back into the pocket, and relief angle 176 that prevents the gouging of the blades by trapped solids.

The rotor and caps are made of hardened abrasion-resistant iron castings. Abrasion-resistant materials extend the life of the bearings. They also reduce the erosion rate of the cap 30 due to the scraping of the solids as they are conveyed by the rotor, and of cap 24 at vent slot 83 (FIG. 5B) by high-velocity dust-laden air during the depressurization of the return-side pockets. The casing is made of carbon steel. The springs are coil springs are made of spring steel. The bearing balls are made of hardened bearing steel and are grease-lubricated.

The invention is used in sizes from 4 to 36" in diameter with solids capacities ranging from 1/20th to 100 CFM. The dimensions of a typical unit are as follows: Rotary valve size: 10 inches; Rated capacity: 10 CFM; Maximum differential pressure: 40 psig; Rotary valve's RPM at rated capacity: 39; Horsepower input to gearmotor at rated capacity: ½; Maximum size of feedstock: 1.2" ; Air leakage (blowby) into the inlet at 30 psi: 0.3 CFM; Purge-air blower: regenerative type rated at 6 CFM and ½ psi, with an ⅛ hp motor.

Typical dimensions of the 10 Inch unit are as follows: Rotor's pocket dimensions: 4" ID×10" OD×10" high; Rotor blades: 6, each ½" thick; Rotary valve's outer dimensions: 12.5" OD×11.25" high; Inlet and outlet ID: 5.0" ; Airlock's outside dimensions including the inlet, outlet, gearmotor, and flowmeters: 20.5" L×18.0" H×15.5" W; Airlock weight: 180 lbs.

The principles of this invention can also be utilized for injecting solids into high-pressure fluids materials containing coarse, abrasive solids, where conventional airlocks are unsuited. This is because rotary valves are limited to 15 psi by erosion, while screwpumps are unable to form an airseal solids unless they contain a predominance of fines. The invention overcomes both of these limitations.

The principles of this invention can also be utilized as a feeder or a combination feeder and airlock, unless the material contains fine powders. When used as a feeder, the purge-air system and vents are eliminated, and a mechanical seal is installed at the bearings. In addition, a deflector is installed at the downstream side of the inlet to minimize rotor crunch; such deflectors are used in conventional rotary valves. Rotor crunch may also be reduced by tilting the rotary valve, so the pockets aren't completely full of solids as they leave the inlet opening.

The airlock of this invention can be designed to operate at high pressures, in excess of 100 psig. The caps must be designed to withstand the internal pressure without significant deflection. In the smaller airlocks and at lower pressures, the cap is disk-shaped. At larger sizes and pressures, the thickness of the disk becomes objectionable, and fins may be added to the outsides of the caps as stiffeners. The fins are used mainly at the outlet side of the airlock. In very-high-pressure applications, the caps and rotor ends may be conical.

High-pressure operation does increase the stress on the bearings. The stress can be reduced to lower levels by one or more of the following techniques, all of which add to the cost. The bearings can be strengthened by use of replaceable bearings instead of built-in bearings described above. Replaceable bearings consist of bearing assemblies, including the races and balls, that fit in a groove in the rotor. At present, the choice of materials of both the rotor and caps is a compromise between the need to build strong bearings and other needs such as manufacturing costs and abrasion resistance. By using replaceable bearings, these compromises are no longer required, as the bearing can be made of the optimal bearing alloys and manufactured to provide the optimal hardness and finish.

Other methods of extending bearing life include using a stronger design (two rows of balls instead of one; roller bearings instead of ball bearings). Also, the spring force can also be relieved when the rotary valve is not in use, as the highest load on the bearings occurs when the rotary valve is unpressurized.

The airlock of this invention can be used for high temperature applications because the design eliminates the effects of thermal expansion. The invention can be used at temperatures as high as 1500° F. For designs used with materials hotter than 200° F., the casing is insulated to protect personnel, to minimize thermal distortion of the caps, and to shield the gearmotor. The temperature limit of the invention as described is limited by the bearings to 500° F. with conventional lubricants, and to 900° F. with solid lubricants. At temperatures over 900° F. and to 1500° F., stainless steels and superalloys are used instead of the previously-specified materials to control creep and oxidation. An air motor may be used at the higher temperatures instead of an electrical gearmotor because of its higher temperature capability.

The main application of the invention is with pneumatic conveying systems, where the medium is air. The principles of this invention may be utilized to make a valve to transfer solids into or out of other media such as other gases, vapors, or liquids.

The invention may be used as a letdown airlock, whereby the outlet's pressure is higher than the inlet's. Let-down airlocks are used for ash removal from synthetic fuel plants and pressurized fluidized-bed combustor powerplants, among other applications. The invention is unchanged except for the positions of the vents and purge-air grooves, which are moved from the inlet to the outlet side of the upper cap.

Figure 17:
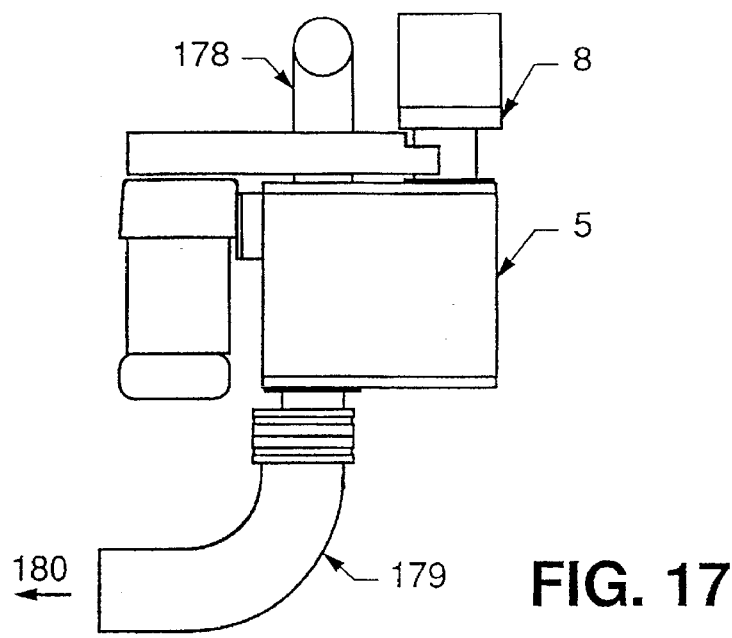
FIG. 17 illustrates an alternative embodiment of the vertical shaft airlock utilizing a blowthrough configuration.

Referring to FIG. 17, an alternative embodiment of the invention utilizing a blowthrough configuration is illustrated. A blowthrough configuration replaces the dropthrough configuration illustrated in FIGS. 1 and 4. With the blowthrough configuration, the conveying air is supplied by pipe 178 at the top of the rotary valve. The conveying air enters the rotary valve at the same position as entry port 15 (FIGS. 2A and 2B), but through a larger opening. The conveying air thus serves to blow material out of the pocket as the pocket passes over outlet opening 32 (FIG. 2B). Pneumatically-conveyed solids leave at location 180 through fitting 179, which has replaced pneumatic conveying pipe 6 of the dropthrough design. With the blowthrough design, the gearmotor is positioned at the return side 131 (FIG. 9A) of the rotary valve rather than at outlet side 134 (FIG. 9A), in order to avoid interfering with the air supply pipe 178.

Referring to FIG. 18, a schematic diagram of an air cannon system to dislodge sticky solids is illustrated. Pulses of high pressure air are released as each pocket 17 (FIG. 2A)

passes over outlet opening 32 (FIG. 2B). The system includes compressor 188 that supplies compressed air, typically at 80–100 psi, to an accumulator 187, and valve sprocket 62 attached to shaft 15 which has 6 equally-spaced protrusions 181 on its hub. Proximity sensor 182 is located next to the sprocket and sends a signal to delay-timer relay 183 as each protrusion 181 passes by. Relay 183 sends a momentary signal to solenoid 186, which sends a pulse of air to the rotary valve. The pulse is ducted to a nozzle at opening 15, which serves to dislodge the sticky solids from the pockets as they pass over outlet opening 27. The pulse is also ducted to high-pressure entry ports at duct 137a (FIG. 11), where it serves to prevent the reverse flow of air into the high-pressure purge-air grooves. Checkvalve 185 prevents the reverse flow of high-pressure purge-air from leaking out at the orifice at openings when the air cannon is not in operation.

The preferred embodiment uses bearings that are outboard of the rotor pockets. The outboard design provides the necessary resistance to the moments produced by the eccentric distribution of air pressure within the rotary valve. Resistance to this moment may instead be provided by an axial outboard design, consisting of a hub and shaft built into each end of the rotor, and two bearings that are mounted on the end of each shaft. All of the bearings are smaller in diameter than the rotor's inner tube. One bearing is a turntable bearing mounted between the rotor's inner tube and the adjoining cap, which serves to control the size of the gaps between the rotor ends and the caps. The other bearing is a radial bearing that is mounted between the shaft and the opening inside a yoke. The yoke is a structure that extends vertically beyond the plane of the cap by a significant distance and is rigidly attached to the cylindrical sleeve. Because of its distance from the cap's surface, the radial bearing provides the stiffness needed to prevent the rotor from tilting. Compared with the bearings of the preferred embodiment, the axial-outboard bearing configuration uses smaller bearings which are-more readily available, but increases the rotary valve's height, complexity, and shaft size.

The rotary valve of this invention can utilize the many alternative materials and methods of construction commonly used in the manufacture of conventional rotary valves. Stainless steels or corrosion-resistant alloys are used for the caps and rotors in corrosive environments. Gray iron and other lower-cost grades of cast iron may be used if the material being injected is both non-abrasive and non-corrosive. The rotor may be fabricated instead of cast to reduce surface roughness and improve the release of sticky solids at the outlet. Low-friction coatings may be used with cast or fabricated rotors for the same purpose. The rotor and caps may be plated to increase their hardness and corrosion resistance. Sanitary applications require the use of fabricated stainless steel to minimize contamination.

The chain-and-sprocket drive train of the preferred embodiment may be replaced by a shaft-driven system. The shaft-driven system uses right-angle drives to transmit the power. Alternatively, the gearmotor may be mounted over the rotary valve and coupled directly to it. Use of the shaft-driven systems eliminates the wear associated with chain drives, but adds to its cost and size.

The range of blade and pocket configurations is similar to that of conventional rotary valves. Adjustable blades may be used instead of fixed blades, and chamfered blades may be used to prevent the buildup of sticky materials. Shallow pockets may be used to increase the uniformity of flow when large airlocks are used at low flows. The invention may use more than six blades per rotor, although the reason for doing so with conventional rotary valves, of reducing blowby and erosion, isn't applicable in the invention. Alternatively, it may use less than six blades.

An alternative source of pressurized purge-air is air tapped upstream of an orifice or other restriction in the pneumatic conveying pipe. This eliminates the need for a purge-air blower, but may increase the total power requirement significantly. Another alternative source of purge-air is an independent source of compressed air, which may also increases the power requirement significantly. Static seals such as O-rings or metal piston rings could be installed at the rotor ends and ends of the blades to reduce manufacturing accuracy requirements and reduce blowby. Such seals wear out quickly, however, which limits their usefulness. Liquid seals may be used at the inner and outer rings, whereby the gap surfaces are coated by a film of a liquid such as oil. The liquid is kept from being blown out of the gap by capillary action. Liquid seals are unsuitable for sealing the blades because they would be contaminated by solids.

The rotor shaft for mounting the sprocket driven by the gearmotor may project downward instead of upward, as a matter of convenience in some installations.

The springs used to assemble the airlock casing must meet certain requirements. When fully loaded, they must be strong enough to withstand the internal pressure in the airlock. In addition, the spring constant must be low enough to provide for a relatively constant force over the range of thermal expansions, and also to minimize the accuracy requirements of the spring installation. Also, the springs should also be relatively compact.

Coil springs are the preferred design in most applications. For high-pressure, large-diameter units, however, gas springs may be utilized. Gas springs incorporate a cylinder filled with high-pressure gas, normally nitrogen, that transmits its force against a sealed, sliding piston. The gas springs are preferred in high-force applications for their compactness, and because assembly and disassembly of the airlock is also made easier by their use. Tensioning of the spring can be done with the flow of high-pressure gas from a gas cylinder, and releasing the spring load is accomplished simply by opening the valve.

A minimum of three springs is needed to keep the airlock tight. Additional springs spaced around the perimeter reduce the thickness requirements of the lower cap needed to keep it from bending excessively with internal pressure. The springs may be located at the top of the airlock instead of the bottom, but they would be more subject to the distortion caused by airlock jamming at that location. Springs may be mounted at both the top and bottom of the casing, although the second set of springs is redundant.

The smaller airlocks can be supported by either their inlet duct or their outlet duct. The larger airlocks are supported by pedestals built into the caps. Either top-mounted or bottom-mounted supports are used. In top-supported airlocks, a flexible seal 7 is used at the outlet duct, and in bottom-supported air-locks, a flexible seal 7 is used at the inlet duct.

Other alternative embodiments are as follows. The cross section of cylindrical casing 26 in the preferred embodiment is circular. However, other shapes are acceptable, such as rectangular and oval. In each case, the shape of the outside of each cap is made to conform with the shape of the casing. The preferred method of attaching cap 24 to casing 26 is with ears 11 and 11a and bolts 12; other methods of attaching these components, such a clamps or threaded holes in the casing, may be used. Vent grooves 80 and 83 may be omitted or modified with only some degradation of performance, particularly with non-abrasive solids. Flexible seal 7 is attached to the outlet instead of the inlet when the rotary valve is top-mounted. No flexible seal 7 is required if the inlet or outlet piping themselves are flexible. The purge-air system may be eliminated if the smallest particles in the powders are larger than gaps 21 and 31. The purge-air ducting to the grooves 38 and 49 at the ends of the blades may be eliminated if the material is non-abrasive. The inlet fitting 8, flange 23, and cap 24 may be made integral. Similarly, outlet fitting 9 may be made integral with cap 30.

Other variations, modifications, and other implementations of what is described herein will occur to those of ordinary skill in the art without departing from the spirit and the scope of the invention as claimed. Accordingly, the invention is to be defined not by the preceding illustrative description but instead by the following claims.

What is claimed is:

1. A rotary valve, comprising:
   a) a rotor assembly rotatable by a driver to cause material to be transferred from an inlet side to an outlet side of the rotary valve, the rotor assembly including a rotor coupled to a shaft which rotates about an axis when driven by the driver, the rotor including:
   an outer tube,
   an inner tube,
   a plurality of radial blades, wherein the outer tube, inner tube, and radial blades are all of substantially the same height and the radial blades extend between the outer and inner tubes and are connected thereto to define a plurality of pockets between the outer and inner tubes, the pockets being open at a top and a bottom of the rotor, and
   a hub connected to the inner tube and coupled to the shaft;
   b) a casing assembly for supporting the rotor assembly, and including an inlet for allowing the material to enter the pockets of the rotor assembly and an outlet for allowing the material to exit the rotor assembly, the casing assembly including:
   an upper cap disposed at a top of the casing assembly that contains an opening for allowing the material to enter the pockets of the rotor assembly, a shaft opening, and a wiper assembly that removes material from the blades as the blades pass by the inlet opening,
   a sleeve coupled to the upper cap, the sleeve being shorter than the rotor, and
   a lower cap disposed at the bottom of the casing assembly that contains an opening for allowing the material in the pockets of the rotor assembly to exit, wherein the lower surface of the upper cap conforms to the shape of the top of the rotor and the upper surface of the lower cap conforms to the shape of the bottom of the rotor;
   c) a plurality of springs coupling the lower cap to the sleeve that serve to compress the rotor between the caps; and
   d) a bearing assembly for rotatably supporting the rotor inside the casing assembly, comprising an upper bearing which separates the upper cap from the top of the rotor by a minimum gap, a lower bearing which separates the lower cap from the bottom of the rotor by a minimum gap, and bearing grooves in which the bearings are disposed.

2. The valve of claim 1 wherein the bearings are located at a diameter greater than the outside diameter of the rotor pockets.

3. The valve of claim 1 wherein the bearings are ball bearings.

4. The valve of claim 3 wherein the contact angle between the bearing balls and the bearing grooves is 90° relative to thrust loads, and is sufficiently high to prevent the bearing grooves from riding up on the bearing balls due to radial loads.

5. The valve of claim 1 wherein the driver comprises a motor and a means for transmitting an output of the motor to the rotor shaft.

6. The valve of claim 1 further comprising an opening on a supply side of the upper cap and an opening on a return side of the upper cap, both openings being ducted to a low-pressure receiver, wherein each opening is sufficiently distant from the outlet side of the rotary valve so as to prevent the escape of air from the outlet directly to the openings, and is sufficiently distant from the inlet side of the rotary valve to minimize the blowby of air into the rotary valve's inlet.

7. The valve of claim 6 further comprising a means for supplying a clean, pressurized fluid to the gaps between the rotor and upper cap, the supplying means including:
   a source of clean, pressurized fluid;
   a plurality of conduits from the source to entry ports in the upper cap; and
   a first plurality of circumferential grooves at the top of the rotary valve, wherein each groove is supplied by an entry port, circumscribes an arc around the axis of the rotary valve, and comprises:
   a first set of grooves located adjacent to, but at a diameter less than, the inner diameter of the rotor pockets;
   a second set of grooves located adjacent to, but at a diameter greater than, the outer diameter of the rotor pockets; and
   a plurality of circumferential grooves at the top of the rotor, each circumscribing an arc around the axis of the rotor, and comprising:
   a third set of grooves, located at substantially the same diameter as the first set of grooves;
   a fourth set of grooves, located at substantially the same diameter as the second set of grooves;
   a second plurality of entry ports and circumferential grooves whose function and relative position are the same as the first plurality of entry ports and circumferential grooves, but which is located at the bottom of the rotary valve; and
   a plurality of openings in the casing for removing compressed fluid from the rotary valve.

8. The valve of claim 7 further comprising a plurality of conduits terminating in inlet ports in the top and bottom caps, which are connected to:
   a fifth set of grooves located adjacent to, and at a larger diameter than, the second and fourth set of such grooves, but at a diameter smaller than that of the bearing grooves;
   a sixth set of grooves, located at each end of the rotor at substantially the same diameter as the fifth set of such grooves;
   a seventh set of grooves, one at the end of each blade of the rotor and extending for substantially the length of each blade; and
   a plurality of passages in the rotor which connect the sixth and seventh sets of such grooves.

9. The valve of claim 7 wherein the clean pressurized fluid supplied to the outlet side of the rotary valve is at high pressure and the fluid supplied to the inlet side of the rotary valve is at low pressure, further comprising:

a flow restriction device placed in the conduit upstream of each groove on the inlet side of the rotary valve wherein the flow restriction device creates a pressure drop significantly higher than the pressure drop between the grooves and adjoining gaps between the rotor and the cap such that no flow restrictions are placed in the conduits upstream of the high-pressure grooves of the rotary valves.

10. The valve of claim 7 wherein the pressurized fluid is obtained from a conveying conduit at an inlet port upstream of the rotary valve wherein part of the clean pressurized fluid is ducted to a blower and then to the inlet ports at the outlet side of the rotary valve; and wherein the remainder of the clean pressurized fluid is ducted to a pressure regulator, flow restrictions, and then to the inlet ports at the inlet side of the rotary valve.

11. The valve of claim 7 wherein the compressed fluid is the same as the fluid at the rotary valve's outlet.

12. The valve of claim 8, wherein the compressed fluid is air.

13. The valve of claim 1 wherein the wiper assembly includes a brush for removing dry materials from the top of the blades, a knife for removing particles remaining after the brush, and channels for allowing dry, clean fluid to flow from the tops of the blades to remove any remaining particles.

14. The valve of claim 1 wherein the wiper assembly includes a flexible wiper for removing wet or sticky materials from the top of the blades, a knife for removing particles remaining after the flexible wiper, and a second wiper to remove any remaining material from the tops of the blades.

15. The valve of claim 1 further comprising a means for providing pulses of pressurized fluid to a nozzle mounted in an opening in the upper cap directly over the rotary valve's outlet, wherein the pulse is emitted as the center of each pocket become centered over the outlet, and wherein the pulses remove sticky solids from the rotary valve and prevent contaminated air from entering the gaps.

16. The valve of claim 1 wherein the conduit for supplying conveying fluid is attached to an opening in the upper cap directly over the rotary valve's outlet.

17. The valve of claim 1 further comprising an aperture on a supply side of the upper cap and an aperture on a return side of the upper cap, wherein both apertures are ducted to a low-pressure receiver and each aperture is sufficiently distant from the inlet side of the rotary valve to prevent the escape of fluid from the outlet directly to the openings, and is sufficiently distant from the outlet side of the rotary valve to minimize the blowby of fluid into the rotary valve's outlet.

18. The valve of claim 17 wherein the inlet ports and grooves for supplying clean high-pressure fluids are at the inlet side of the rotary valve, and the inlet ports and grooves for supplying clean low-pressure fluids are at the outlet side of the rotary valve.

19. A method of operating the valve of claim 1 comprising the steps of:

supplying solids to the rotary valve at a throughflow rate less than the conveying capacity of the rotary valve; and attaching the rotary valve's outlet means to a pneumatic conveying pipe that supplies pneumatic conveying fluid.

* * * * *